(12) United States Patent
Pucella et al.

(10) Patent No.: US 12,270,214 B2
(45) Date of Patent: Apr. 8, 2025

(54) MORTAR APPLICATOR AND MORTAR APPLICATION SYSTEM HAVING SAME

(71) Applicant: GROUPE REFRACO INC., Chicoutimi (CA)

(72) Inventors: Giovanni Pucella, Chicoutimi (CA); Lavoie Marc-Michel, Chicoutimi (CA); Guillaume Keighan, Saint-Charles-de-Bourget (CA); Jean-Daniel Dufour, Alma (CA); Eric Goudreault, Jonquiere (CA); Jean-Philippe Morasse, Alma (CA)

(73) Assignee: GROUPE RÉFRACO INC., Chicoutimi (CA)

( * ) Notice: Subject to any disclaimer, the term of this patent is extended or adjusted under 35 U.S.C. 154(b) by 227 days.

(21) Appl. No.: 18/001,373

(22) PCT Filed: Jun. 9, 2021

(86) PCT No.: PCT/CA2021/050788
§ 371 (c)(1),
(2) Date: Dec. 9, 2022

(87) PCT Pub. No.: WO2021/248241
PCT Pub. Date: Dec. 16, 2021

(65) Prior Publication Data
US 2023/0235583 A1 Jul. 27, 2023

Related U.S. Application Data

(60) Provisional application No. 63/036,715, filed on Jun. 9, 2020.

(51) Int. Cl.
*E04G 21/22* (2006.01)
*B05C 5/02* (2006.01)
(Continued)

(52) U.S. Cl.
CPC ............ *E04G 21/22* (2013.01); *B05C 5/0233* (2013.01); *B05C 5/0262* (2013.01); *B25J 18/00* (2013.01);
(Continued)

(58) Field of Classification Search
CPC ........ E04G 21/22; E04G 21/202; B25J 18/00; B05C 5/0216; B05C 17/012;
(Continued)

(56) References Cited

U.S. PATENT DOCUMENTS 3,254,806 A 6/1966 Kirstein
3,658,213 A 4/1972 Plumer
(Continued)

FOREIGN PATENT DOCUMENTS

CN 2732904 Y 10/2005
CN 201661435 U 12/2010
(Continued)

OTHER PUBLICATIONS

International Search Report and Written Opinion issued in corresponding International application No. PCT/CA2021/050788 on Aug. 26, 2021.
(Continued)

*Primary Examiner* — Frederick C Nicolas
(74) *Attorney, Agent, or Firm* — BCF LLP

(57) ABSTRACT

A mortar applicator includes: a duct; a piston movably mounted within the duct, dividing the duct into first and second variable volume chambers; a pump fluidly connected to the first variable volume chamber; a nozzle operatively connected to a first end of the duct to discharge mortar contained in the first variable volume chamber; and a motor operatively connected to the piston. A rack and pinion assembly operatively connects the motor to the piston and includes a rack configured to drive the piston and a pinion
(Continued)

connected to the motor. In a discharge mode, the motor drives the rack and pinion assembly, moving the piston to force mortar through the nozzle opening to discharge mortar from the mortar applicator. In a refill mode, the pump fills the first variable volume chamber with mortar, forcing the piston to retract. The rack moves with the piston in the discharge and refill modes.

17 Claims, 14 Drawing Sheets

(51) Int. Cl.
    *B25J 18/00*    (2006.01)
    *E04G 21/20*    (2006.01)
    *B05C 17/01*    (2006.01)

(52) U.S. Cl.
    CPC .......... *E04G 21/202* (2013.01); *B05C 5/0216* (2013.01); *B05C 17/0103* (2013.01); *B05C 17/012* (2013.01); *B05C 17/0146* (2013.01)

(58) Field of Classification Search
    CPC . B05C 17/0146; B05C 5/0233; B05C 5/0262; B05C 17/0103
    See application file for complete search history.

(56) References Cited

U.S. PATENT DOCUMENTS

| | | | |
|---|---|---|---|
| 3,788,791 A | 1/1974 | Munz | |
| 3,851,806 A | 12/1974 | Peyser | |
| 3,918,616 A | 11/1975 | Goldsmith | |
| 3,918,617 A | 11/1975 | Gregg | |
| 4,260,076 A | 4/1981 | Bergman | |
| 4,583,934 A * | 4/1986 | Hata | B05C 17/0103 222/386 |
| 4,986,454 A | 1/1991 | Riley | |
| 5,295,614 A | 3/1994 | Chang | |
| 5,326,001 A | 7/1994 | Holmquist et al. | |
| 5,439,131 A | 8/1995 | Kato | |
| 5,450,988 A * | 9/1995 | Jerdee | B05C 17/0103 74/424.89 |
| 5,556,009 A | 9/1996 | Motzko | |
| 5,762,239 A * | 6/1998 | Cossette | B05C 17/00553 222/326 |
| 5,882,691 A | 3/1999 | Conboy | |
| 6,089,407 A * | 7/2000 | Gardos | B05C 17/0103 222/137 |
| 6,186,764 B1 | 2/2001 | Murase et al. | |
| 6,234,359 B1 | 5/2001 | Brown et al. | |
| 6,422,427 B1 | 7/2002 | Brown et al. | |
| 6,540,113 B2 * | 4/2003 | Gardos | B05C 17/0103 222/326 |
| 7,118,366 B2 | 10/2006 | Grimm et al. | |
| 7,185,792 B2 | 3/2007 | Gibbons et al. | |
| 7,261,131 B2 | 8/2007 | Cleveland et al. | |
| 8,181,829 B2 | 5/2012 | Nobusawa | |
| 8,528,785 B2 | 9/2013 | Naughton | |
| 8,870,035 B2 | 10/2014 | Jalali et al. | |
| 8,998,039 B2 | 4/2015 | Kimura et al. | |
| 9,033,189 B2 | 5/2015 | Sato et al. | |
| 9,039,557 B2 | 5/2015 | Naughton et al. | |
| 9,745,182 B2 | 8/2017 | Hogan | |
| 10,265,721 B2 | 4/2019 | Beckett et al. | |
| 10,299,903 B2 | 5/2019 | Buckley et al. | |
| 2002/0108971 A1 | 8/2002 | Lafond | |
| 2009/0001096 A1 | 1/2009 | Wagner et al. | |
| 2011/0253747 A1 | 10/2011 | Tobler et al. | |
| 2013/0152855 A1 | 6/2013 | Hartman et al. | |
| 2017/0066157 A1 | 3/2017 | Peters et al. | |
| 2018/0200920 A1 | 7/2018 | Zhang | |
| 2018/0345302 A1 | 12/2018 | Tayh et al. | |
| 2021/0112819 A1 * | 4/2021 | Hetherington | A61M 5/3158 |
| 2023/0129688 A1 * | 4/2023 | Pucella | B05C 5/0262 52/749.14 |

FOREIGN PATENT DOCUMENTS

| | | |
|---|---|---|
| CN | 108748616 A | 11/2018 |
| CN | 210152299 U | 3/2020 |
| DE | 3808626 A1 | 9/1989 |
| EP | 3037177 A1 | 6/2016 |
| GB | 2274609 A | 8/1994 |
| JP | S597026 A | 1/1984 |
| JP | S61227868 A | 10/1986 |
| JP | 2007007641 A | 1/2007 |
| WO | 2009007204 A1 | 1/2009 |

OTHER PUBLICATIONS

European Search Report issued in co-pending European application No. 2221499.4 on Apr. 24, 2023.

Supplementary European Search Report issued in co-pending European application 2182269.7 on Sep. 22, 2023.

* cited by examiner

MORTAR APPLICATOR AND MORTAR APPLICATION SYSTEM HAVING SAME

CROSS-REFERENCE

The present application claims priority from U.S. Provisional Patent Application 63/036,715, filed Jun. 9, 2020, the entirety of which is incorporated by reference herein.

FIELD OF TECHNOLOGY

The present technology relates to mortar applicators.

BACKGROUND

Mortar is often used to create a joint between different bricks to build a given structure (e.g., a wall). Notably, mortar is applied on one or more surfaces of a brick to lay another brick thereon such that the mortar, once dried, establishes a joint between the two bricks.

Manually applying mortar can require significant manpower, particularly when the size and/or number of structures to be built is important. In addition, the resultant joints between different bricks can be of inconsistent quality due to the manual nature of the process. While certain automated solutions exist for applying mortar, these can be difficult to adapt to variable requirements of mortar application, can be overly complex, overly bulky or relatively expensive to produce.

There is therefore a desire for a mortar applicator which addresses at least in part some of the aforementioned drawbacks.

SUMMARY

It is an object of the present technology to ameliorate at least some of the inconveniences present in the prior art.

According to an aspect of the present technology, there is provided a mortar applicator. The mortar applicator includes: a duct having a first end and a second end; a piston movably mounted within the duct, the piston dividing the duct into first and second variable volume chambers on opposite sides of the piston, the first variable volume chamber being defined between the piston and the first end of the duct, the second variable volume chamber being defined between the piston and the second end of the duct; a pump fluidly connected to the first variable volume chamber to selectively fill the first variable volume chamber with mortar; a nozzle operatively connected to the first end of the duct, the nozzle defining a nozzle opening in fluid communication with the first variable volume chamber to discharge mortar contained therein; a motor operatively connected to the piston; and a rack and pinion assembly operatively connecting the motor to the piston, the rack and pinion assembly including a rack configured to drive the piston and a pinion connected to the motor. The mortar applicator is operable in a discharge mode and a refill mode. In the discharge mode, the motor drives the rack and pinion assembly thereby moving the piston toward the first end of the duct to force mortar contained in the first variable volume chamber through the nozzle opening to discharge mortar from the mortar applicator. In the refill mode, the pump fills the first variable volume chamber with mortar thereby forcing the piston to retract away from the first end of the duct. The rack moves with the piston in the discharge and refill modes.

In some embodiments, the mortar applicator also includes a clutch for selectively connecting the motor with the rack and pinion assembly. In the discharge mode, the clutch couples the motor to the pinion to allow the motor to drive the rack. In the refill mode, the clutch decouples the motor from the pinion.

In some embodiments, the mortar applicator also includes a controller in communication with: the pump to selectively activate and deactivate the pump to fill the first variable volume chamber with mortar; and a clutch actuator operatively connected to the clutch to couple the motor to the pinion and to decouple the motor from the pinion. The controller controls the clutch actuator to decouple the motor from the pinion when the controller activates the pump.

In some embodiments, the controller is in communication with the motor to control operation of the motor.

In some embodiments, the mortar applicator also includes a controller in communication with the motor. The motor is a servomotor. In the discharge mode, the controller controls the servomotor to drive the rack and pinion assembly to move the piston toward the first end of the duct. In the refill mode, the controller controls the servomotor to permit free motion of the rack and pinion assembly in response to movement of the piston toward the second end of the duct.

In some embodiments, the mortar applicator also includes a piston position sensor configured to sense a position of the piston within the duct. The piston is movable within the duct from a fully retracted position to a fully extended position, a range of motion of the piston being defined between the fully retracted and fully extended positions. A volume of the first variable volume chamber decreases from the fully retracted position to the fully extended position of the piston. The controller is in communication with the piston position sensor. The controller controls the servomotor to operate the mortar applicator in the refill mode when the controller receives a signal from the piston position sensor indicating that the piston has reached the fully extended position.

In some embodiments, the servomotor includes a plurality of gears, the plurality of gears forming a planetary gear.

In some embodiments, the rack is connected to the piston.

In some embodiments, the piston floats within the duct; the rack pushes the piston when the mortar applicator is operated in the discharge mode; and the piston pushes the rack when the mortar applicator is operated in the refill mode.

In some embodiments, the mortar applicator also includes a piston position sensor configured to sense a position of the piston within the duct; and a controller in communication with the piston position sensor and the pump, the controller selectively activating and deactivating the pump based on a signal received from the piston position sensor.

In some embodiments, the mortar applicator also includes a cover member selectively movable between an open position and a closed position to respectively allow and prevent mortar to be discharged through the nozzle opening, the cover member being disposed in the closed position when the mortar applicator is in the refill mode.

In some embodiments, a mortar application system includes the mortar applicator and a robotic arm supporting the mortar applicator such that motion of the robotic arm moves the mortar applicator.

In some embodiments, the mortar application system also includes a movable platform that is movable along a predefined path, the robotic arm being mounted to the movable platform.

According to another aspect of the present technology, there is provided a method for assembling a brick wall using a mortar application system. The system includes: at least one robotic arm; a mortar applicator movable by the at least one robotic arm, the mortar applicator including: a duct having a first end and a second end; a piston movably mounted within the duct, the piston dividing the duct into first and second variable volume chambers on opposite sides of the piston, the first variable volume chamber being defined between the piston and the first end of the duct, the second variable volume chamber being defined between the piston and the second end of the duct; a pump fluidly connected to the first variable volume chamber to selectively fill the first variable volume chamber with mortar; a nozzle operatively connected to the first end of the duct, the nozzle defining a nozzle opening in fluid communication with the first variable volume chamber to discharge mortar contained therein; a motor operatively connected to the piston; and a rack and pinion assembly operatively connecting the motor to the piston, the rack and pinion assembly including a rack configured to drive the piston and a pinion connected to the motor. The method includes: moving the mortar applicator to a mortar laying position using the at least one robotic arm; applying mortar to at least one of an existing portion of the wall and a brick to be placed on the wall by moving the piston toward the first end of the duct with the rack and pinion assembly being driven by the motor; placing the brick in position on the existing portion of the wall using the at least one robotic arm; and pumping mortar into the first variable volume chamber, said pumping of mortar causing the piston to move toward the second end of the duct.

In some embodiments, the mortar applicator also includes a clutch for selectively connecting the motor with the rack and pinion assembly. Moving the piston toward the first end of the duct includes coupling the motor to the pinion to allow the motor to drive the rack. The method also includes decoupling the motor from the pinion to allow the piston to move toward the second end of the duct when pumping mortar into the first variable volume chamber.

In some embodiments, the motor is a servomotor. Moving the piston toward the first end of the duct includes driving the rack and pinion assembly via the servomotor to move the piston toward the first end of the duct. The method also includes: controlling the servomotor to permit free motion of the rack and pinion assembly in response to movement of the piston toward the second end of the duct.

In some embodiments, the mortar applicator also includes a cover member selectively movable between an open position and a closed position to respectively allow and prevent mortar to be discharged through the nozzle opening. The method also includes moving the cover member to the closed position prior to pumping mortar into the first variable volume chamber.

According to another aspect of the present technology, there is provided a mortar applicator. The mortar applicator includes: a duct having a first end and a second end; a piston movably mounted within the duct, the piston dividing the duct into first and second variable volume chambers on opposite sides of the piston, the first variable volume chamber being defined between the piston and the first end of the duct, the second variable volume chamber being defined between the piston and the second end of the duct; a piston actuator operatively connected to the piston, the piston actuator being operable to move the piston within the duct; a nozzle assembly located at the first end of the duct, the nozzle assembly having a tip defining a nozzle opening in fluid communication with the first variable volume chamber to discharge mortar contained therein; and a cover member selectively movable between an open position and a closed position to respectively allow and prevent mortar to be discharged through the nozzle opening. In the open position, the cover member is disposed clear of the nozzle opening. In the closed position, the cover member is disposed such that: the cover member covers the nozzle opening at the tip of the nozzle assembly; and an inner surface of the cover member is in contact with an outer surface of the tip of the nozzle assembly so as to substantially seal the nozzle opening. The mortar applicator also includes a cover member actuator operatively connected to the cover member, the cover member actuator being operable to move the cover member between the open position and the closed position.

In some embodiments, the cover member is pivotable about a pivot axis between the open position and the closed position.

In some embodiments, the cover member is configured to shear mortar residue at the tip of the nozzle assembly when pivoting from the open position to the closed position.

In some embodiments, the mortar applicator also includes a pivoting link operatively connecting the cover member to the cover member actuator, the cover member actuator being configured to cause the pivoting link to pivot about the pivot axis.

In some embodiments, the cover member actuator is a linear actuator.

In some embodiments, the cover member actuator has a fixed portion and a movable portion. The fixed portion of the cover member actuator is connected to the duct. The movable portion of the cover member actuator is operatively connected to the pivoting link.

In some embodiments, the cover member actuator is a pneumatic actuator.

In some embodiments, the nozzle assembly includes: a nozzle connected to the first end of the duct, the nozzle defining the nozzle opening; and a polymeric tip member connected to the nozzle, the tip member defining the outer surface of the tip of the nozzle assembly.

In some embodiments, the nozzle assembly also includes an elastomeric end member disposed between the nozzle and the tip member.

In some embodiments, the nozzle has a tapering shape such that outer dimensions of the nozzle gradually reduce toward the tip of the nozzle assembly.

In some embodiments, the nozzle defines an inner passage for discharging mortar therefrom; the inner passage has a converging section and a straight section, the straight section being closer to the tip of the nozzle assembly than the converging section; and the dimensions of the inner passage gradually reduce in the converging section toward the straight section.

In some embodiments, the mortar applicator also includes a controller in communication with the cover member actuator, the controller being operable to selectively actuate the cover member actuator so as to move the cover member between the open and closed positions.

In some embodiments, the mortar applicator also includes a pump fluidly connected to the first variable volume chamber to selectively fill the first variable volume chamber with mortar. The controller is in communication with the pump. The controller activates the pump to fill the first variable volume chamber once the cover member is in the closed position.

In some embodiments, a mortar application system includes: the mortar applicator; and a robotic arm supporting the mortar applicator such that motion of the robotic arm moves the mortar applicator.

In some embodiments, the mortar application system also includes a movable platform that is movable along a predefined path, the robotic arm being mounted to the movable platform.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
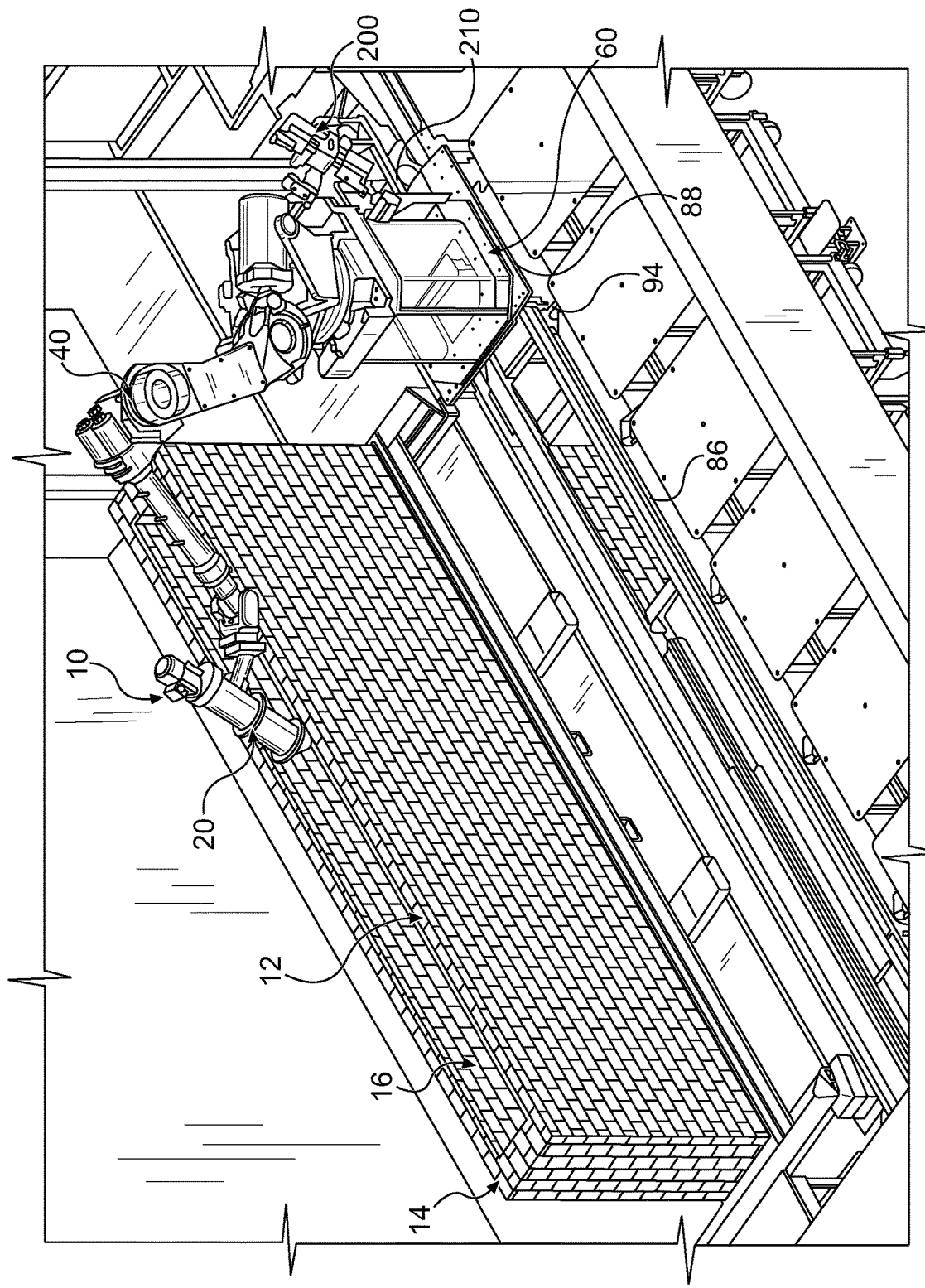
FIG. 1 is a perspective view of a mortar application system.
Figure 2:
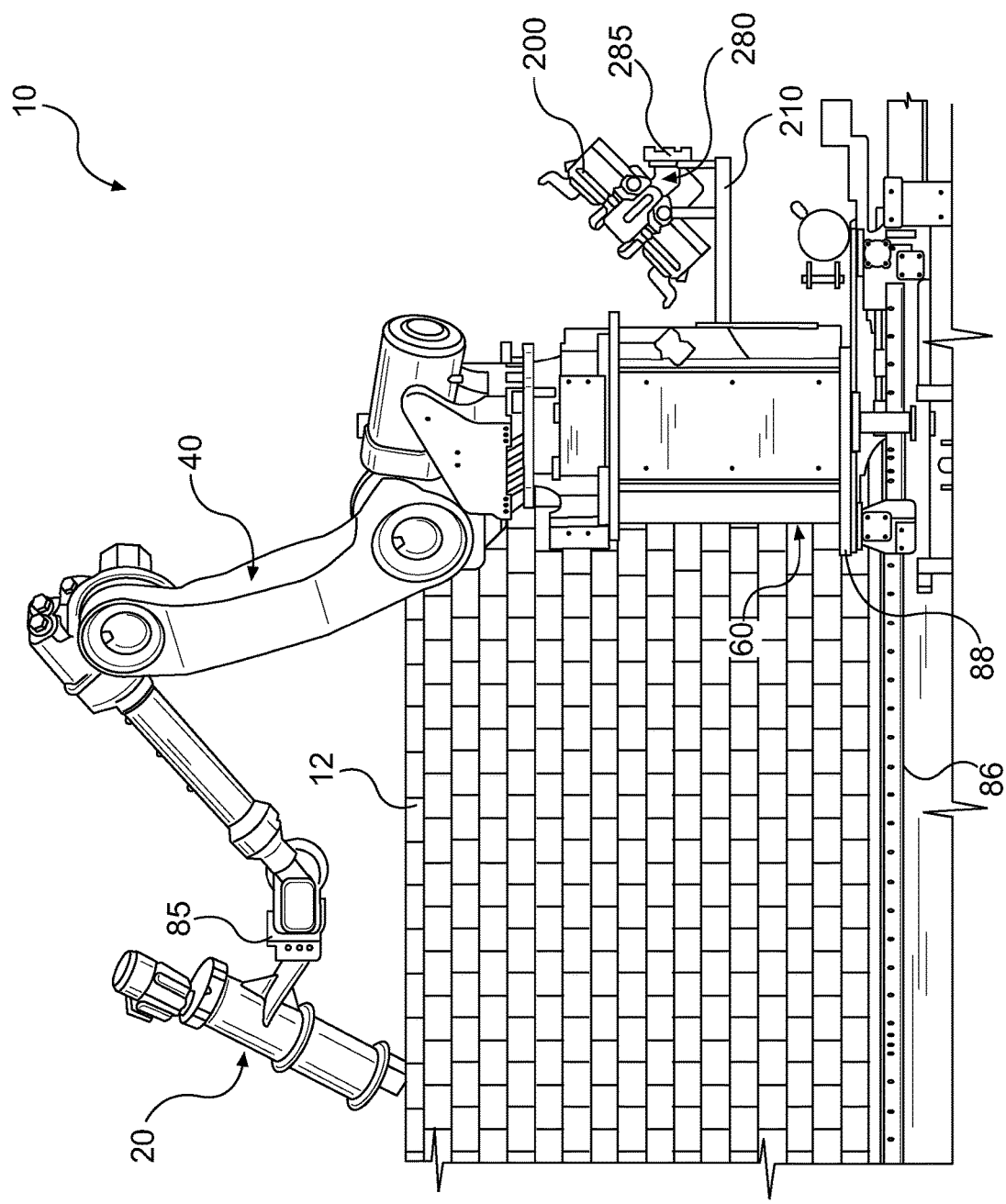
FIG. 2 is an elevation view of the mortar application system of FIG. 1.

An exemplary embodiment of a mortar application system 10 according to an embodiment of the present technology is shown in FIGS. 1 and 2. The mortar application system 10 is configured to apply a layer of mortar atop a surface. Notably, in this example, the mortar application system 10 is used to apply mortar on a surface formed by multiple bricks 12 which form a brick wall. After applying mortar on the bricks 12, other bricks can then be placed thereon to continue forming the wall. As can be seen, in this example, the bricks 12 are arranged so as to form a double wall structure 14 that defines a central space 16 therein. More specifically, the double wall structure 14 is part of an anode baking furnace. It is contemplated that the mortar application system 10 may be used for building structures other than a furnace in other embodiments.

As shown in FIG. 1, the mortar application system 10 includes a mortar applicator 20 that is configured to discharge mortar onto the bricks 12 through a nozzle assembly 30 thereof. As will be described below, the mortar applicator 20 is designed so as to facilitate filling mortar therein while ensuring uniformity of mortar applied thereby. Moreover, the design of the mortar applicator 20 can minimize an amount of mortar residue thereof that can spoil the evenness of a layer of mortar applied on the bricks 12 by the mortar applicator 20. These features of the mortar applicator 20 will be described in greater detail below.

In this embodiment, the mortar application system 10 is configured to control motion of the mortar applicator 20 so as to guide the application of mortar on the bricks 12. Notably, the motion of the mortar applicator 20 is automated. To that end, the mortar application system 10 includes a robotic arm 40 that supports the mortar applicator 20, and a movable base 60 which in turn supports the robotic arm 40. The robotic arm 40 and the movable base 60 collaborate to control the motion of the mortar applicator 20.

Figure 4:
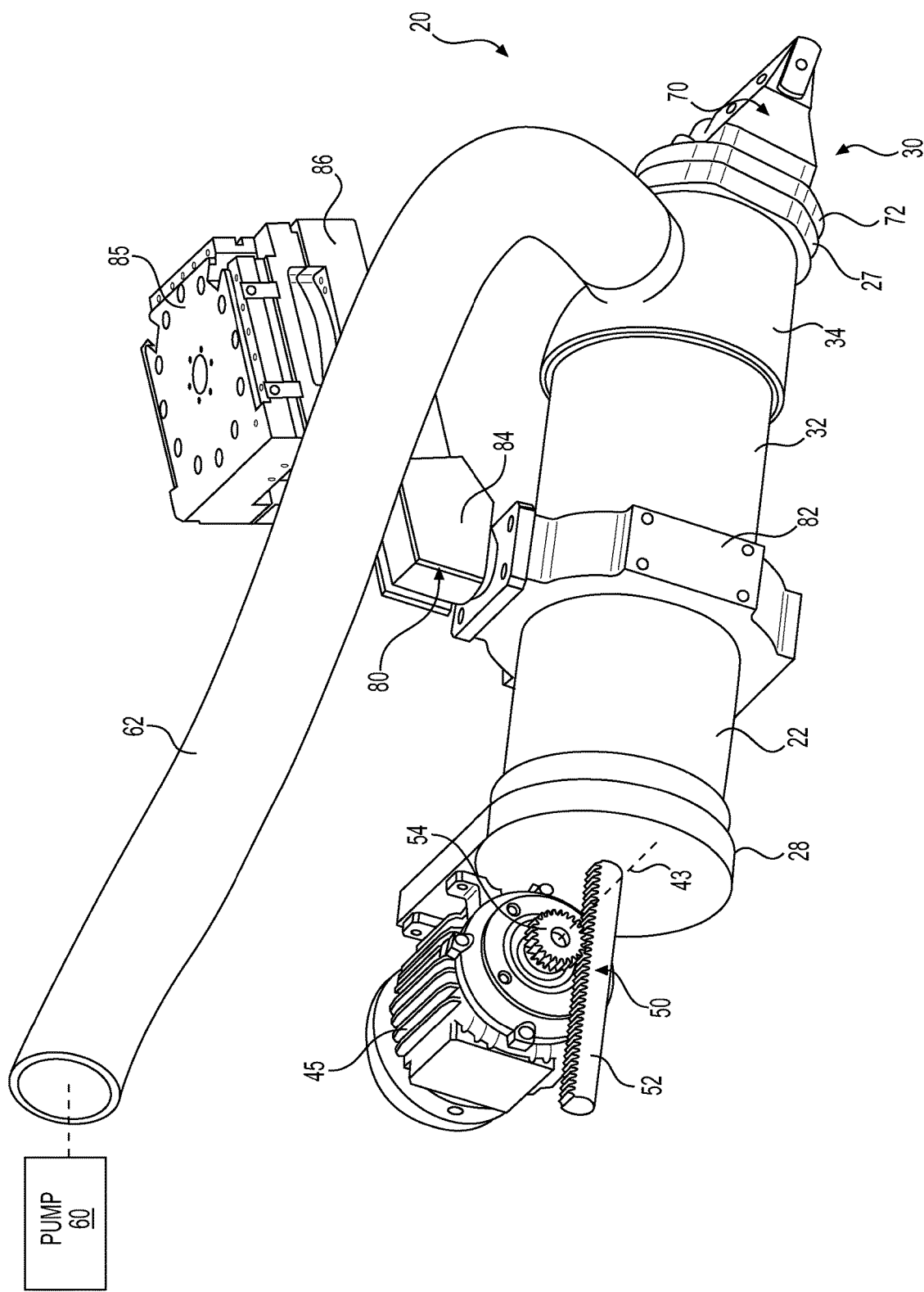
FIG. 4 is a perspective view, taken from a distal end, of a mortar applicator of the mortar application system of FIG. 1.

As shown in FIG. 4, a support 80 operatively connects the mortar applicator 20 to the robotic arm 40. In particular, the support 80 includes a collar 82 surrounding a duct 22 of the mortar applicator 20. The support 80 has a support body 84 connected between the collar 80 and a connecting flange 86. The connecting flange 86 is connected to a robotic arm interface 85 of the robotic arm 40. The robotic arm interface 85 is used by the robotic arm 40 to hold and manipulate the mortar applicator 20.

The robotic arm 40 is programmed to align the mortar applicator 20 in a position to apply mortar to a mortar application surface (in this example, the top surface formed by the bricks 12—i.e. an existing portion of the brick wall). This may be referred to as the "mortar laying position". Notably, in this embodiment, the robotic arm 40 is programmed to position the mortar applicator 20 such that a tip 35 of the nozzle assembly 30, which is elongated, is generally parallel to the mortar application surface, and the nozzle assembly 30 is rotated about a generally vertically-extending yaw axis such that a nozzle opening 31 of the nozzle assembly 30 (through which mortar is discharged) extends diagonally relative to the width direction of the mortar application surface. This may allow more control and thus consistency over the resultant extruded layer of mortar applied on the mortar application surface. Notably, the robotic arm 40 can manipulate the mortar applicator 20 to rotate the nozzle assembly 30 about the yaw axis and thereby adjust the width of the resultant extruded layer of mortar. It is understood that the mortar laying position may be different in other embodiments.

It is contemplated that, in other embodiments, rather than applying mortar on an existing portion of the brick wall, the robotic arm 40 may move the mortar applicator 20 to apply mortar on a brick 12 to be placed on the wall.

The robotic arm 40 has multiple actuators 212 (shown schematically in FIG. 3) that are operated together to control motion of the robotic arm 40. The robotic arm 40 may be any suitable type of robotic arm. For instance, in this example of implementation, the robotic arm 40 is a FANUC™ R-2000iB™ series robot.

It is contemplated that, in some embodiments, the robotic arm 40 may be omitted and the mortar applicator 20 may be directly supported by the movable base 60.

As shown in FIGS. 1 and 2, the movable base 60 supports the robotic arm 40. The movable base 60 includes a rail 86 and a platform 88 that is movable along the rail 86. The rail 86 sets out a predefined path of the platform 88. In this example, the predefined path is a linear path such that the robotic arm 40 can be displaced linearly next to the wall. A platform actuator 94 (e.g., a servomotor) controls motion of the platform 88 along the rail 86. Notably, in this embodiment, the platform 88 has motorized wheels (not shown), with each wheel being powered by its corresponding actuator 94. In other embodiments, a single actuator 94 at one of the wheels controls motion of the platform 88. For instance, an example of the movable base 60 is the Trackmotion Floor TMF™ system developed by GÜDEL AG of Switzerland.

In this embodiment, as shown in FIGS. 1 and 2, the mortar application system 10 also includes a brick laying tool 200 which is disposed on a rack 210 connected to the movable base 60 such that it follows the platform 88 as it moves. The brick laying tool 200 is configured to handle bricks to be laid to build the furnace 14 (or other intended structure). The brick laying tool 200 may thus have a grip for holding a brick therewith. The brick laying tool 200 is used subsequently once the mortar applicator 20 has applied a layer of mortar atop the mortar application surface of the layer of bricks 12. Notably, once the layer of mortar has been applied, the robotic arm 40 moves the mortar applicator 20 on the rack 210 and disconnects from the robotic arm interface 85. The robotic arm 40 then connects to a robotic arm interface 285 (FIG. 2) of the brick laying tool 200 which is mounted to a support 280 of the brick laying tool 200. The robotic arm 40 then removes the brick laying tool 200 from the rack 210. The support 280 and the robotic arm interface 285 are similar to the support 80 and the robotic arm interface 85 described above. Once connected to the robotic arm 40, the brick laying tool 200 grabs a brick (from a brick feeding station—not shown) and lays it atop the layer of mortar previously applied by the mortar applicator 20. The movable base 60 is used to move the robotic arm 40 and the brick laying tool 200. Once an entire layer of bricks 12 is laid atop the layer of mortar by the robotic arm 40 and the brick laying tool 200, the brick laying tool 200 is dismounted from the robotic arm 40, placed on the rack 210 and swapped for the mortar applicator 20. The process is then repeated. It is contemplated that instead of laying an entire layer of bricks before swapping from the brick laying tool 200 back to the mortar applicator 20, this could be done after a section of bricks has been laid or even after a single brick has been laid.

It is contemplated that, in other embodiments, a separate robotic arm may be provided to handle the brick laying tool 200.

Figure 3:
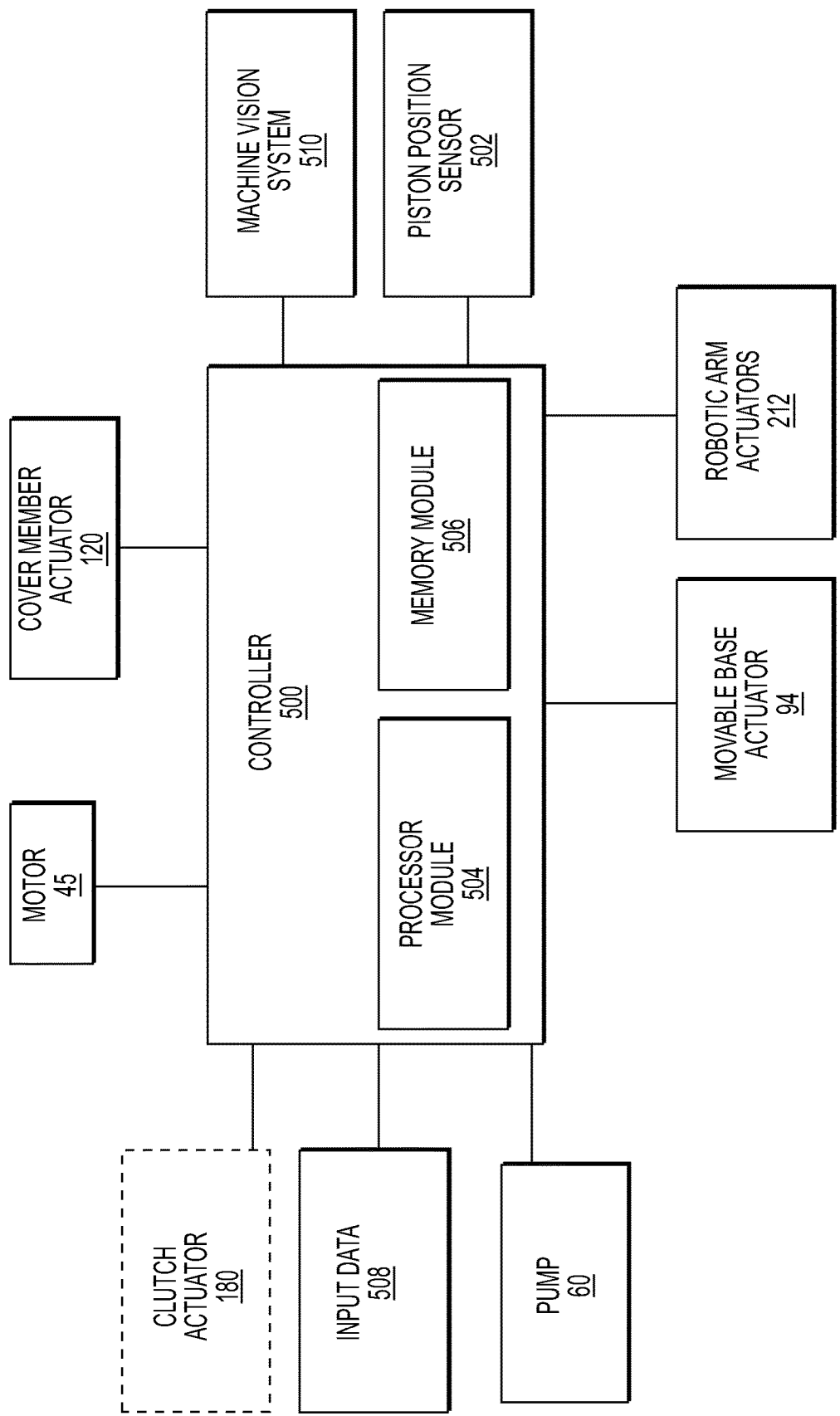
FIG. 3 is a schematic illustration of a control system of the mortar application system of FIG. 1.

As shown in FIG. 3, the controller 500 is in communication with the robotic arm actuators 212 and controls their operation such that the controller 500 controls the motion of the robotic arm 40. The controller 500 has a processor module 504 for carrying out executable code, and a non-transitory memory module 506 that stores the executable code in a non-transitory medium (not shown) included in the memory module 506. The processor module 504 includes one or more processors for performing processing operations that implement functionality of the controller 500. The processor module 504 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory module 506 may be a semiconductor memory (e.g., read-only memory (ROM) and/or random-access memory (RAM)), a magnetic storage medium, an optical storage medium, and/or any other suitable type of memory. While the controller 500 is represented as being one entity in this implementation, it is understood that the controller 500 could comprise separate entities for controlling components separately.

In order to control the robotic arm 40, the controller 500 is in communication with sensors (not shown) associated with the robotic arm 40. In this embodiment, the controller 500 communicates with a machine vision system 510 used as feedback from the robotic arm 40. This allows the controller 500 to map the positioning of the robotic arm 40.

Furthermore, in this embodiment, the controller 500 is in communication with the platform actuator 94 and controls its operation such that the controller 500 controls the motion of the platform 88 along the rail 86. It is contemplated that, in other embodiments, a separate controller may control operation of the actuator 94 such that the robotic arm actuators 212 and the platform actuator 94 are controlled by different controllers. In such embodiments, the two separate controllers may be in communication with one another to be responsive to one another's operations.

The mortar applicator 20 will now be described in detail with reference to FIGS. 4 to 14.

Figure 5:
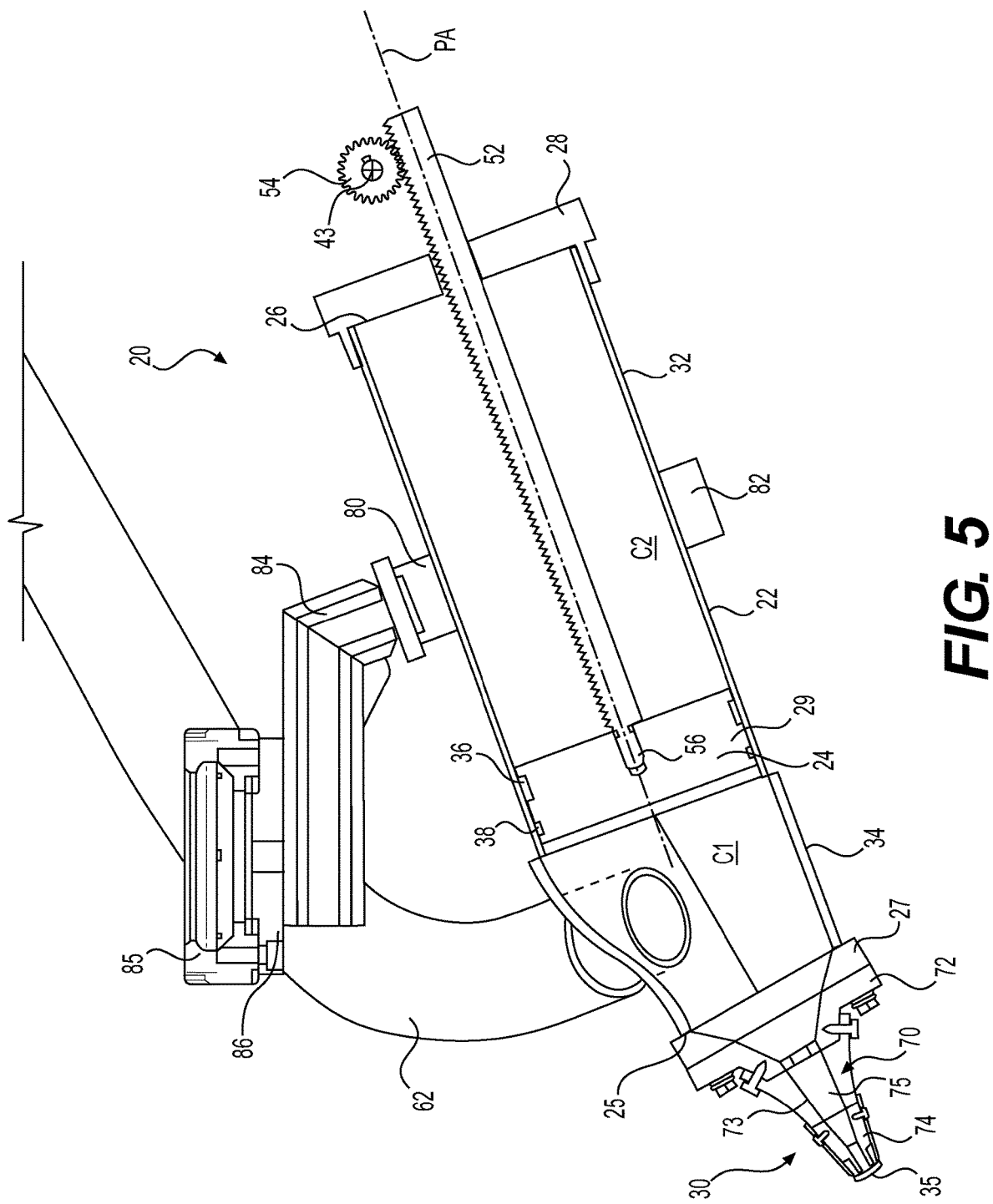
FIG. 5 is a cross-sectional view of the mortar applicator of FIG. 4, with a piston thereof shown in a fully extended position.
Figure 6:
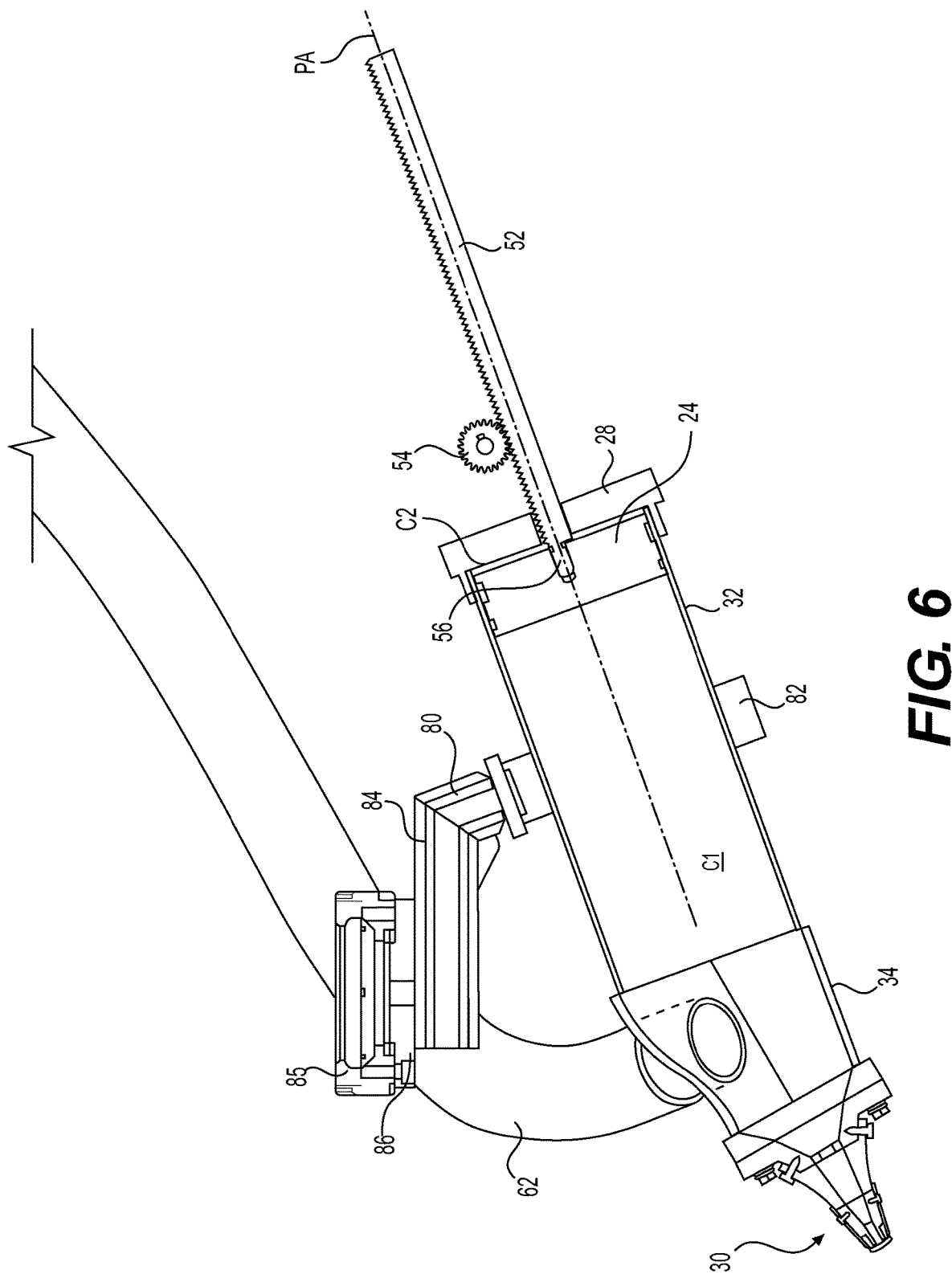
FIG. 6 is a cross-sectional view of the mortar applicator of FIG. 4, with the piston thereof shown in a fully retracted position.

As shown FIGS. 4 to 6, the mortar applicator 20 includes a duct 22 and a piston 24 movably mounted within the duct 22. The duct 22 has a proximal end 25 and a distal end 26 opposite the proximal end 25. A distal end cap 28 closes off the distal end 26 of the duct 22. The nozzle assembly 30 of the mortar applicator 20, which will be described in greater detail below, is fluidly connected to the proximal end 25 of the duct 22 for discharging mortar from the mortar applicator 20 through the nozzle opening 31. In this embodiment, the duct 22 includes a cylindrical portion 32 and a tapering portion 34 connected to the cylindrical portion 32. The cylindrical portion 32 defines the distal end 26 of the duct 22 while the tapering portion 34 defines the proximal end 25 of the duct 22. As can be seen, the collar 82 of the support 80 surrounds the cylindrical portion 32 of the duct 22.

As shown in FIGS. 5 and 6, the piston 24 divides the duct 22 into a proximal variable volume chamber C1 and a distal variable volume chamber C2 on opposite sides of the piston 24. More specifically, the proximal variable volume chamber C1 is defined between the piston 24 and the proximal end 25 of the duct 22, and the distal variable volume chamber C2 is defined between the piston 24 and the distal end 26 of the duct 22. The nozzle opening 31 is in fluid communication with the proximal variable volume chamber C1. As will be described in greater detail below, the piston 24 is movable within the duct 22 along a piston axis PA from a fully retracted position (shown in FIG. 6) to a fully extended position (shown in FIG. 5) and vice-versa. The respective volumes of the variable volume chambers C1, C2 change as the piston 24 moves within its range of motion defined between the fully retracted and fully extended positions. Notably, the volume of the proximal variable volume chamber C1 decreases from the fully retracted position to the fully extended position of the piston 24. Conversely, the volume of the distal variable volume chamber C2 increases from the fully retracted position to the fully extended position of the piston 24.

In this embodiment, the piston 24 is generally cylindrical to match a shape of the cylindrical portion 32 of the duct 22. Notably, in its fully extended position, the piston 24 is disposed at a proximal end of the cylindrical portion 32 and does not extend beyond the cylindrical portion 32. In other words, the range of motion of the piston 24 is defined between the proximal and distal ends of the cylindrical portion 32 of the duct 22, without extending into the tapering portion 34. The piston 34 is in a sliding fit with the inner wall of the cylindrical portion 32. As shown in FIG. 5, sealing members 36, 38 are mounted to a skirt 29 of the piston 24 to seal the proximal variable volume chamber C1 from the distal variable volume chamber C2 on opposite sides of the piston 42. In particular, in this embodiment, the sealing member 36 is a scraper such as a piston ring and the sealing member 38 is a rubber piston wear ring. Additional and/or different types of sealing members may be used in other embodiments (e.g., an O-ring). Each of the sealing members 36, 38 is in contact with the inner wall of the cylindrical portion 32 of the duct 22.

In use, the proximal variable volume chamber C1 contains mortar therein so that the mortar can be discharged from the proximal variable volume chamber C1 through the nozzle assembly 30. The proximal variable volume chamber C1 will thus be referred to as the "mortar chamber" hereinafter. As schematically shown in FIG. 4, in this embodiment, the mortar chamber C1 is fluidly connected to a pump 60 through a hose 62 so that mortar can be pumped into the mortar chamber C1. In particular, one end of the hose 62 is fluidly connected to the tapering portion 34 of the duct 22, and an opposite end of the hose 62 is fluidly connected to the pump 60. A solenoid valve (not shown) closes and opens fluid communication between the pump 60 and the mortar chamber C1. Other types of valves are contemplated. The pump 60 is fed by a mortar source (not shown) to pump the mortar through the hose 62 and into the mortar chamber C1. Mortar pumps such as the mortar pump 60 are known and will thus not be further described here. The controller 500 is in communication with the pump 60 to selectively activate and deactivate the pump 60 so as to fill the mortar chamber C1 with mortar. The controller 500 is also in communication with the solenoid valve to control its operation.

It is contemplated that, in some embodiments, the pump 60 could be omitted. In such embodiments, the mortar chamber C1 could be filled with mortar by moving the piston 24 from the fully extended position to the fully retracted position to form a vacuum in the mortar chamber C1 so as to suck mortar through the hose 62 into the mortar chamber C1.

As shown in FIG. 4, in this embodiment, an electrical motor 45 mounted to the distal end cap 28 is operatively connected to the piston 24 for driving thereof. The motor 45 comprises a compact gear reduction unit (not shown). A rack and pinion assembly 50 operatively connects the motor 45 to the piston 24 so as to drive the piston 24 when the mortar applicator 20 discharges mortar through the nozzle assembly 30. As shown in FIGS. 4 to 6, the rack and pinion assembly 50 includes a rack 52 configured to drive the piston 24, and a pinion 54 connected to the motor 45. The pinion 54 is drivingly connected to an output shaft 42 of the motor 45 so as to rotate, together with the output shaft 42, about an output axis 43 defined by the output shaft 42. The output axis 43 is generally perpendicular to the piston axis PA. The pinion 54 is in a keyed engagement with the output shaft 42 to allow the motor 45 to drive the pinion 54. The teeth of the pinion 54 are in engagement with the teeth of the rack 52 so that when the output shaft 42 rotates, rotation of the pinion 54 results in a linear motion of the rack 52. As will be understood, the direction of the linear motion of the rack 52 depends on the direction of rotation of the pinion 54 and thereby of the output shaft 42.

The rack 52 extends through an opening defined by the distal end cap 28 so as to partly extend within the duct 22. In this embodiment, a proximal end 56 of the rack 52 is connected to the piston 24 so that the linear motion of the rack 52 moves the piston 24 along the piston axis PA. In particular, the proximal end 56 of the rack 52 is inserted within a recess defined by the distal surface of the piston 24. The proximal end 56 is retained in the recess by a press fit with the piston 24. The proximal end 56 may be connected to the piston 24 in any other suitable way in other embodiments. Alternatively, in some embodiments, the proximal end 56 of the rack 52 may not be connected to the piston 24. For instance, the piston 24 could be floating within the duct 22.

As shown in FIG. 3, the controller 500 is in communication with the motor 45 to control its operation. Therefore, the controller 500 controls the speed of the piston 24 via operation of the motor 45. In particular, in this embodiment, the controller 500 is in communication with a piston position sensor 502 that senses a position of the piston 24 along the duct 22 and transmits a signal to the controller 500 representative of the position of the piston 24. The speed of the piston 24 can thus be determined by the controller 500 based on the position signal sent thereto by the sensor 502. Alternatively or additionally, the position and speed of the piston 24 can be determined by the controller 500 based on feedback from one or more sensors of the motor 345. The piston 24 is thus displaced within the tube 22 based in part on a feedback loop.

As will be understood, the controller 500 thus controls the speed of the piston 24 as well as the speed of the platform 88 to apply a layer of mortar on the mortar application surface that has a consistent width and thickness to provide a quality joint between the bricks 12. Notably, the dimensions of the layer of mortar extruded by the mortar applicator 20 are affected by the relationship between the speed of the piston 24 and the speed of the platform 88. For instance, by increasing the speed of the piston 24 without a corresponding increase in the speed of the platform 88, the width of the layer of mortar increases but its thickness remains the same. On the other hand, by increasing the speed of the platform 88 without a corresponding increase in the speed of the piston 24, the thickness of the layer of mortar decreases. In one embodiment, a thickness of the mortar layer is approximately 2 mm. In this embodiment, the controller 500 controls these speeds such that a ratio between the speed of the platform 88 over the speed of the piston 24 is approximately 100:1. For instance, in some cases the ratio between the speed of the platform 88 over the speed of the piston 24 may be between 70:1 and 130:1 inclusively, in some cases between 80:1 and 120:1 inclusively, and in some cases between 90:1 and 110:1 inclusively.

As mentioned above, the speed of the piston 24 is at least partially based on the feedback provided by the piston position sensor 502. However, the controller 500 also controls the speed of the piston 24, as well as the speed of the platform 88, based on input data 508 (FIG. 3). The input data 508 is data that is entered by a user into the controller 500 via an input device (e.g., a keyboard, a touchscreen, etc.). The input data 508 includes, for example, a density of the mortar being used in the system 10. Thus, the controller 500 controls the speed of the piston 24, as well as the speed of the platform 88, based at least in part on the density of the mortar to be used in the system 10. Other input data 508 may also factor into the control of the speed of the piston 24 and/or the speed of the platform 88.

The operation of the piston 24, including its driving by the motor 45 and the rack and pinion assembly 50, will be described in greater detail further below.

It is contemplated that, in other embodiments, the motor 45 and the rack and pinion assembly 50 could be replaced by any other suitable type of piston actuator. For example, a hydraulic actuator or a pneumatic actuator could be operatively connected to the piston 24 to drive the piston 24.

Figure 7:
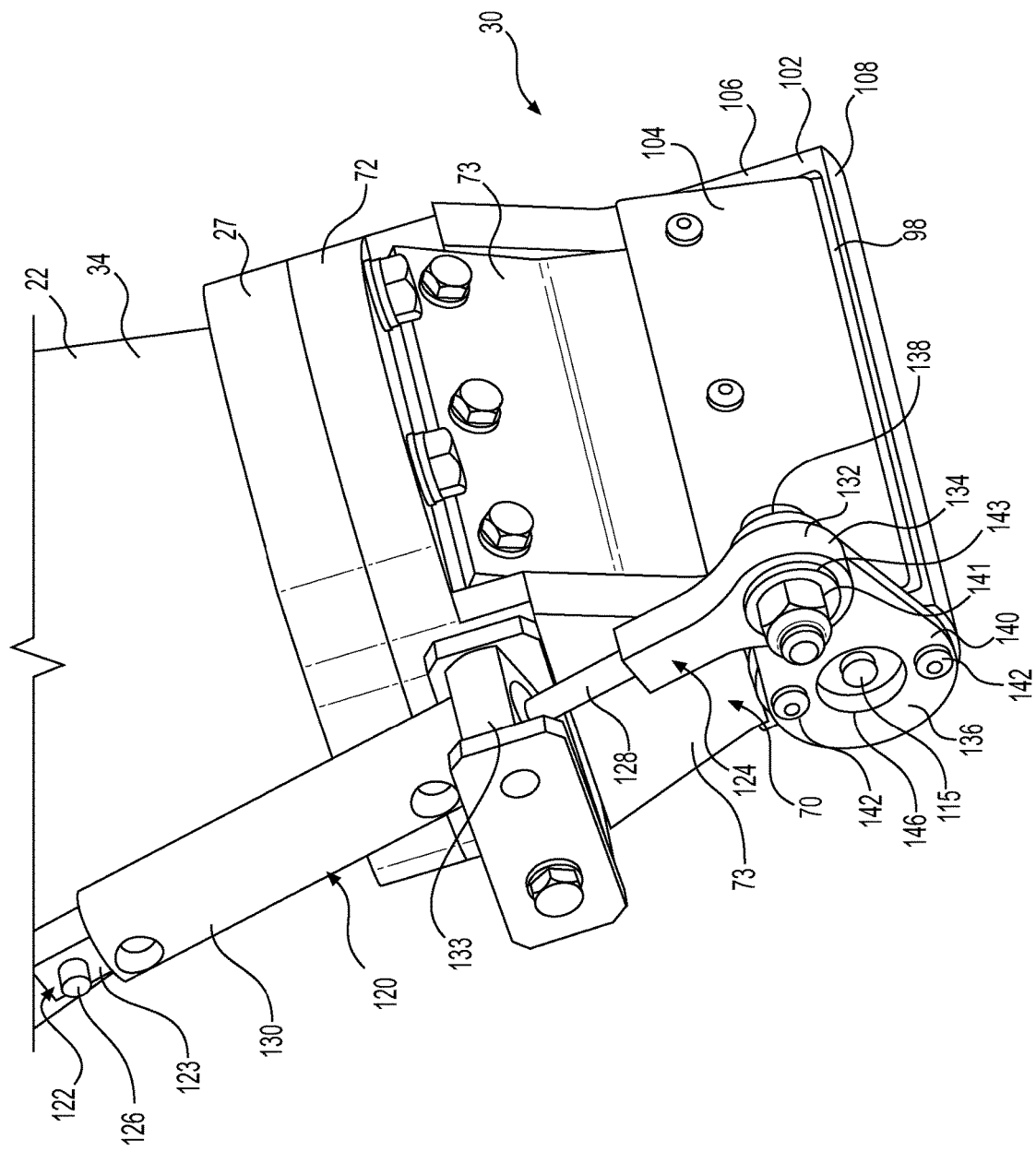
FIG. 7 is a perspective view of part of a proximal end of the mortar applicator of FIG. 4, including a nozzle assembly and a cover assembly thereof.
Figure 8:
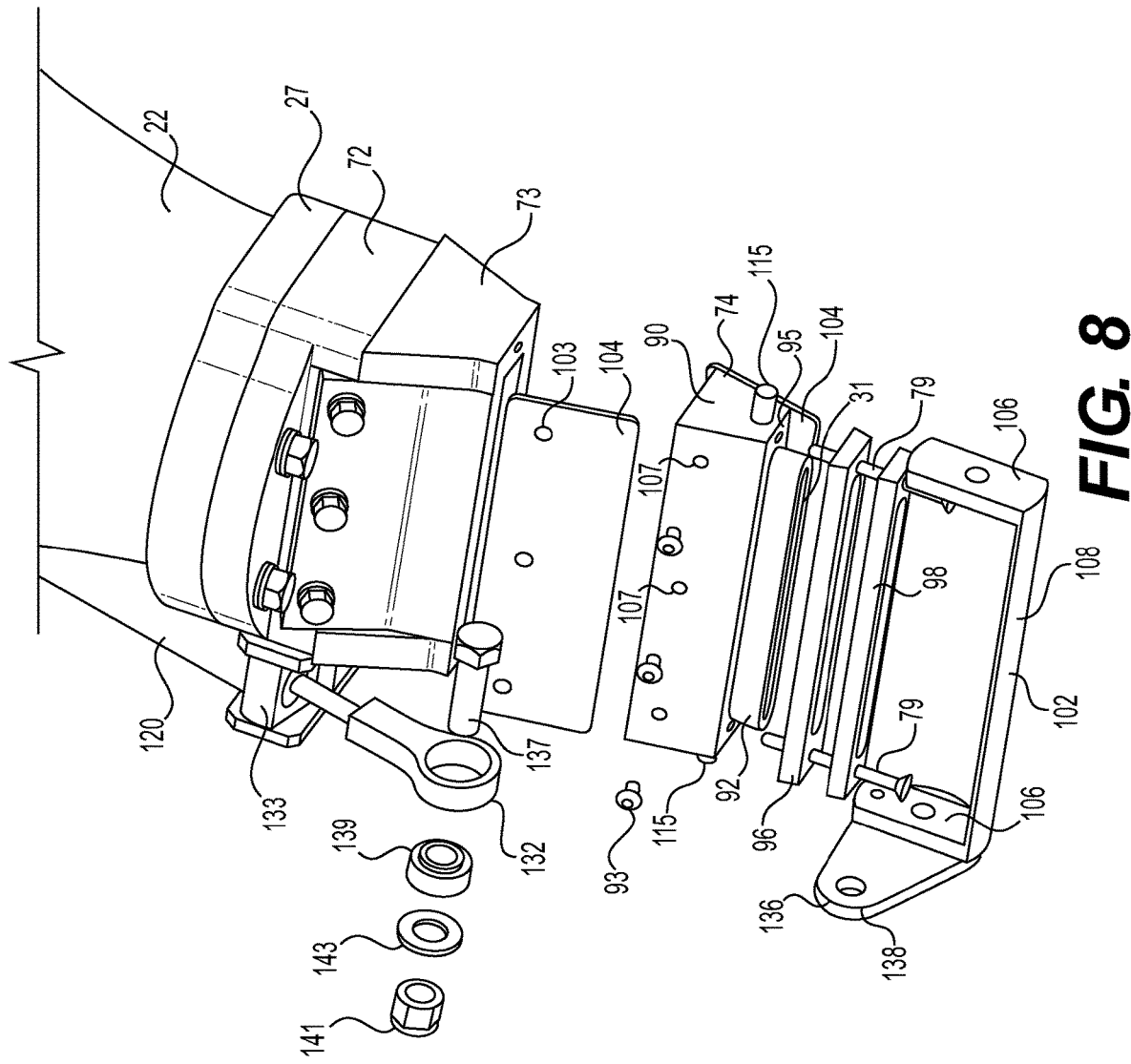
FIG. 8 is an exploded view of part of the mortar applicator of FIG. 4, including the nozzle assembly and the cover assembly thereof.
Figure 10:
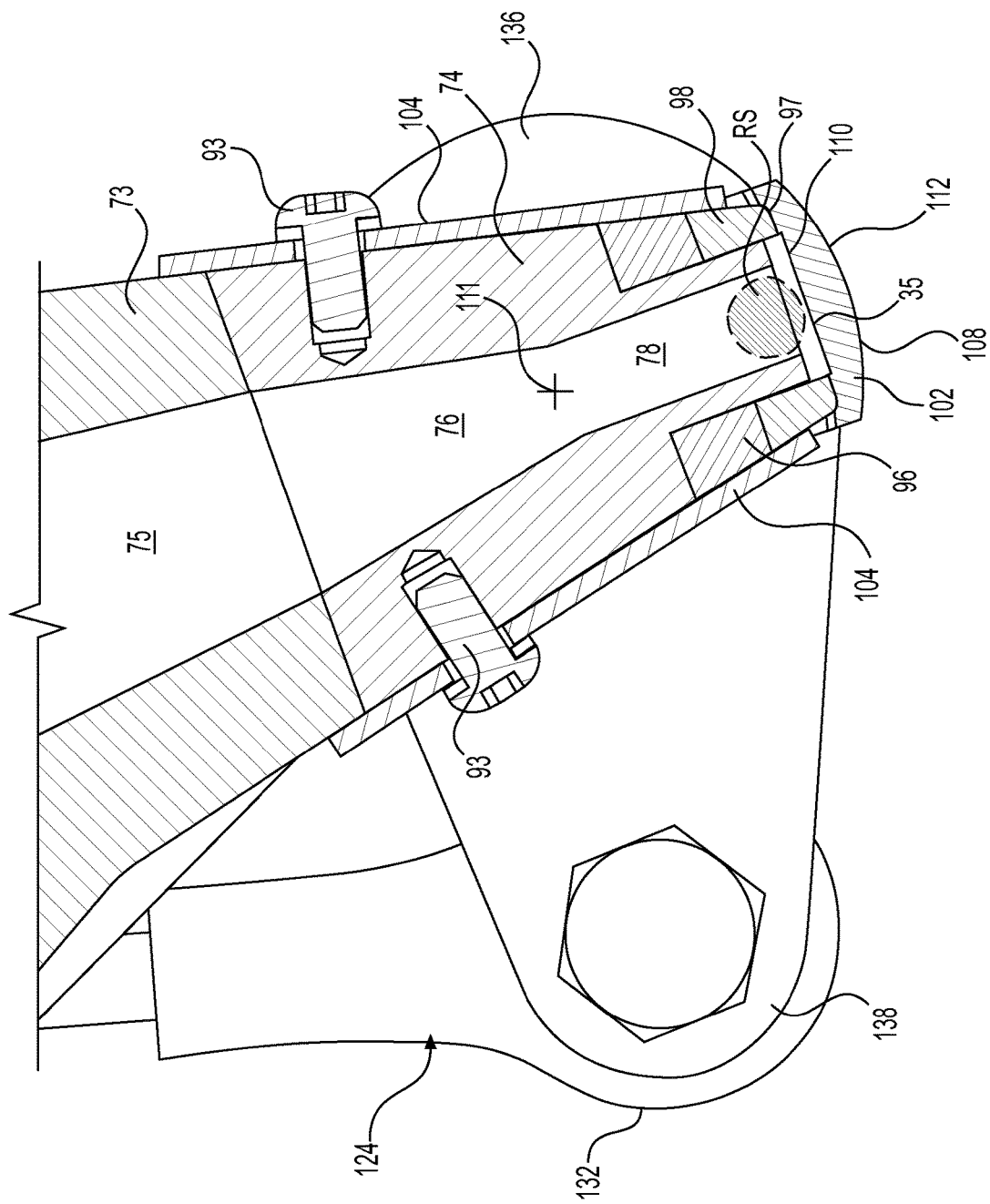
FIG. 10 is a cross-sectional view of part of the nozzle assembly and the cover assembly of FIG. 7, with the cover member shown in a closed position.

Turning now to FIGS. 7 and 8, the nozzle assembly 30 of the mortar applicator 20 includes a nozzle 70 defining the nozzle opening 31 through which mortar is discharged from the mortar applicator 20. The nozzle 70 is connected to a proximal flange 27 at the proximal end 25 of the duct 22 via a nozzle flange member 72 of the nozzle assembly 30. In this embodiment, the nozzle 70 has a tapering shape such that its outer dimensions gradually reduce toward the tip 35 of the nozzle assembly 30. As best shown in FIG. 10, the nozzle 70 defines an inner passage 75 through which mortar flows through the nozzle 70 and out of the nozzle opening 31. In particular, the inner passage 75 is in fluid communication with the mortar chamber C1, via a passage defined by the nozzle flange member 72. The inner passage 75 has a converging section 76 and a straight section 78. The dimensions of the inner passage 75 gradually reduce in the converging section 76 toward the straight section 78. Along the straight section 78, the size of the inner passage 75 is constant. Moreover, as can be seen, the straight section 78 is closer to the tip 35 of the nozzle assembly 30 than the converging section 76.

The inner passage 75 ends at the nozzle opening 31 defined at the tip 35 of the nozzle assembly 30. In this embodiment, the nozzle opening 31 has an elongated and rectilinear shape and thus may be referred to as a "slot". This allows a uniform and continuous layer of mortar to be discharged through the nozzle opening 31. It is contemplated that the nozzle opening 31 could be shaped differently in other embodiments.

In this embodiment, the nozzle 70 includes two nozzle members, namely a distal nozzle member 73 and a proximal nozzle member 74 that are fastened to one another by fasteners 79. Together, the nozzle members 73, 74 define the inner passage 75. The proximal nozzle member 74 defines part of the converging section 76 and the entirety of the straight section 78 of the inner passage 75. As shown in FIG. 8, the proximal nozzle member 74 has an enlarged portion 90 and a reduced portion 92 extending from the enlarged portion 90. The reduced portion 92 defines a proximal end of the nozzle 70. Each of the enlarged and reduced portions 90, 92 defines a corresponding part of the inner passage 75. The dimensions of the outer shape of the reduced portion 92 are smaller than the dimensions of the outer shape of the enlarged portion 90. Moreover, the outer shapes of the enlarged and reduced portions 90, 92 are different and discontinuous from one another. Notably, the enlarged portion 90 has an outer shape of a trapezoidal prism, whereas the reduced portion 92 has a stadium outer shape. The discontinuity of the outer shapes of the enlarged and reduced portions 90, 92 forms an outer shoulder 95 of the proximal nozzle member 74 facing toward the tip 35 of the nozzle assembly 30.

As shown in FIG. 8, an elastomeric end member 96 and a polymeric tip member 98 of the nozzle assembly 30 are connected to the proximal nozzle member 74 of the nozzle 70. As will be described in greater detail below, the elastomeric end member 96 and the polymeric tip member 98 are provided to interact with a cover member 102. The elastomeric end member 96 is retained against the outer shoulder 95 of the proximal nozzle member 74, and the polymeric tip member 98 is retained against the elastomeric end member 96. As such, the elastomeric end member 96 is disposed between the nozzle 70 and the polymeric tip member 98 since the polymeric tip member 98 is disposed proximally of the elastomeric end member 96 so as to define an outer surface 97 of the tip 35 of the nozzle assembly 30. The elastomeric end member 96 and the polymeric tip member 98 define respective nozzle openings so that the elastomeric end member 96 and the polymeric tip member 98 can be placed around the reduced portion 92 of the proximal nozzle member 74, with the reduced portion 92 being inserted through the respective nozzle openings of the elastomeric end member 96 and the polymeric tip member 98.

Figure 9:
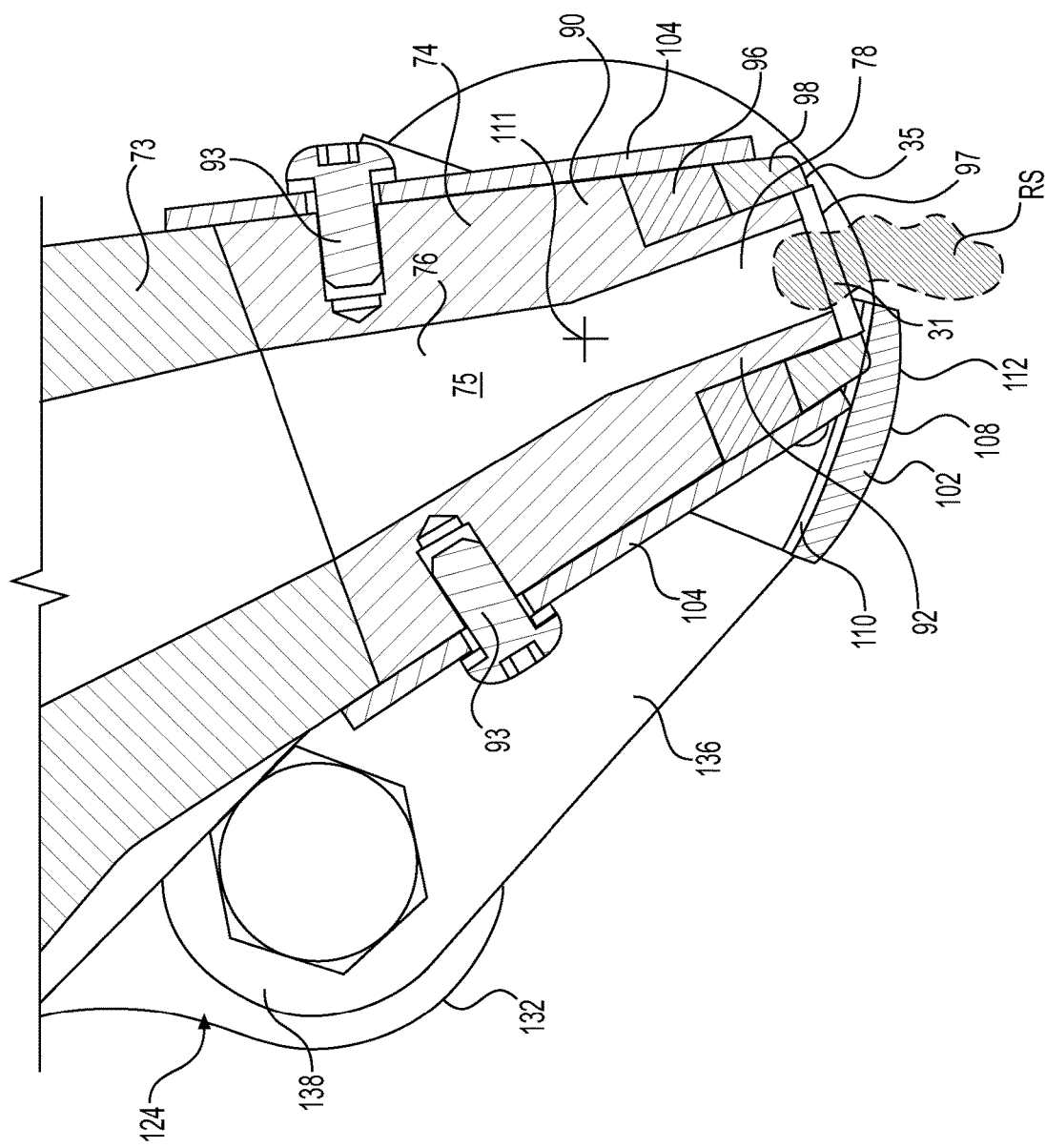
FIG. 9 is a cross-sectional view of part of the nozzle assembly and the cover assembly of FIG. 7, with a cover member of the cover assembly shown in an open position.

In order to connect the elastomeric end member 96 and the polymeric tip member 98 to the nozzle 70, the two fasteners 79 extend through respective fastener openings of the elastomeric end member 96 and the polymeric tip member 98 to secure them to the proximal nozzle member 74. In particular, the outer shoulder 95 defines two openings which receive the fasteners 79. Furthermore, in this embodiment, as shown in FIGS. 8 to 10, two plates 104 are connected to the enlarged portion 90 of the proximal nozzle member 74, on opposite sides thereof by fasteners 93 which extend through respective fastener openings 103 defined by the plates 104 and respective fastener openings 107 defined by the enlarged portion 90 (see FIG. 8). The plates 104 abut the sides of the elastomeric end member 96 and the polymeric tip member 98 so as to cover the sides of the elastomeric end member 96 and the polymeric tip member 98 and push the elastomeric end member 96 and the polymeric tip member 98 against the nozzle 70. As shown in FIGS. 9 and 10, the plates 104 are oriented so as to converge toward one another, notably following the tapering shape of the nozzle 70. In some embodiments, the plates 104 could act as a type of blow off valve. Notably, the spacing between the free ends of the plates 104 may increase, as permitted by the elasticity of the metallic material of the plates 104, to allow the relief of overpressure within the chamber C1. It is contemplated that the plates 104 may be omitted in other embodiments.

The elastomeric end member 96 is made of an elastomeric material. For instance, in this embodiment, the elastomeric end member 96 is made of rubber. It is contemplated that the elastomeric end member 96 could be made of any other suitable elastomeric material in other embodiments. The elastomeric material of the elastomeric end member 96 provides a certain amount of elasticity to the nozzle assembly 30 which is useful for the operation of the cover member 102, as will be discussed in detail below, namely to facilitate sealing of the nozzle 70.

The polymeric tip member 98 is made of a polymeric material. For instance, in this embodiment, the polymeric tip member 98 is made of ultra-high-molecular-weight polyethylene (UHMW). It is contemplated that the polymeric tip member 98 could be made of any other suitable polymeric material in other embodiments. The polymeric material of the polymeric tip member 98 provides a soft material with a low friction coefficient and high abrasion resistance for interaction with the cover member 102 as will be discussed in detail below, namely to facilitate displacement of the cover member 102 over the nozzle 70.

With reference to FIGS. 7 to 10, the mortar applicator 20 also includes a cover assembly 100 including the cover member 102. The cover member 102 is selectively movable between an open position (shown in FIG. 9) and a closed position (shown in FIG. 10) to respectively allow and prevent mortar to be discharged through the nozzle opening 31. Notably, as will be discussed in greater detail below, operation of the cover member 102 allows for the removal of mortar residue RS (FIG. 9) from the tip 35 of the nozzle assembly 30 every time the mortar applicator 20 finishes applying mortar. This ensures that the mortar applicator 20 applies a uniform layer of mortar which might otherwise be ruined if mortar residue (from a previous application of mortar) were to be present at the tip 35 when the mortar applicator 20 begins applying mortar. Moreover, the cover member 102 also closes the nozzle opening 31 in such a manner as to allow pressure to be increased within the mortar chamber C1 as mortar is pumped therein. As will be described in more detail below, this can facilitate operation of the mortar applicator 20.

Figure 11:
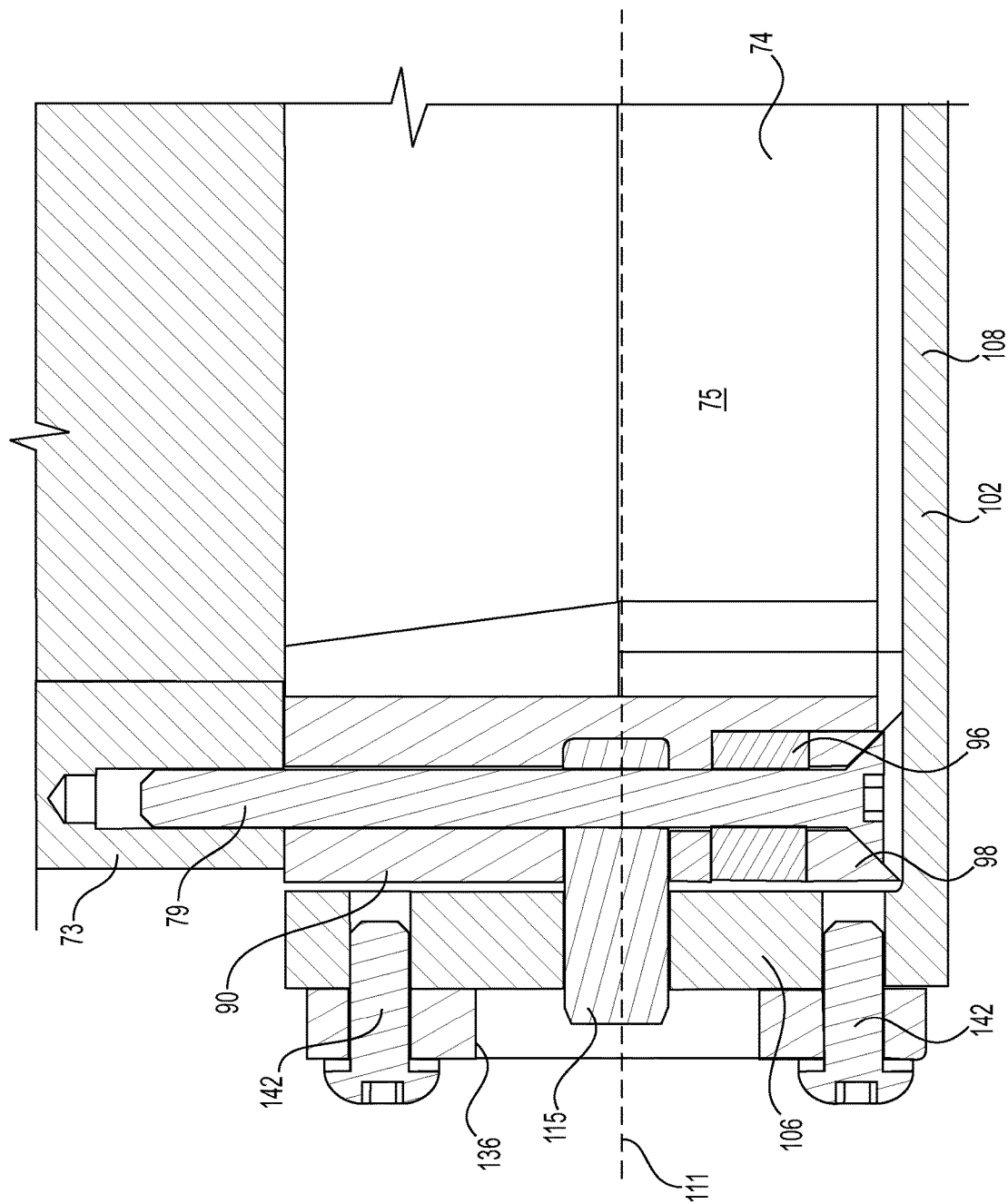
FIG. 11 is a cross-sectional view of part of the nozzle assembly and the cover assembly of FIG. 7.

As best seen in FIG. 8, in this embodiment, the cover member 102 includes two arms 106 and a middle cover portion 108 extending between the two arms 106. The arms 106 are pivotably connected to the nozzle 70 about a pivot axis 111. In particular, as shown in FIG. 11, each arm 106 defines an opening through which a pin 115 is inserted. The pin 115 is received in a respective opening defined by the enlarged portion 90 of the proximal nozzle member 74. The two pins 115 are aligned with one another to define the pivot axis 111. As can be seen, the pivot axis 111 extends through the nozzle 70, and in particular in a direction generally parallel to the direction in which the nozzle opening 31 extends.

The middle cover portion 108 is the part of the cover member 102 which selectively covers the nozzle opening 31. The middle cover portion 108 has an inner surface 110 and an outer surface 112. As shown in FIG. 10, in the closed position of the cover member 102, the inner surface 110 faces the tip 35 of the nozzle assembly 30, namely being in contact with the outer surface 97 of the tip 35 (i.e., with the polymeric tip member 98). The inner surface 110 is curved, namely having a given radius of curvature. The radius of curvature of the inner surface 110 is equal to a distance between the pivot axis 111 and the outer surface 97. This helps maintain the cover member 102 close to the tip 35 in the closed position of the cover member 102 while also ensuring proper closure of the nozzle opening 31 in the closed position of the cover member 102.

As shown in FIG. 9, in the open position, the cover member 102 is disposed clear of the nozzle opening 31. Notably, the cover member 102 is pivoted about the pivot axis 111 such that the middle cover portion 108 is distanced from the nozzle opening 31 to allow flow of mortar out of the nozzle opening 31. As such, in the open position of the cover member 102, mortar contained within the nozzle 70 can be discharged out of the mortar applicator 20 through the nozzle opening 31.

Conversely, as shown in FIG. 10, in the closed position, the cover member 102 is disposed such that the cover member 102 covers the nozzle opening 31 at the tip 35 of the nozzle assembly 30 and such that the inner surface 110 of the cover member 102 is in contact with the outer surface 97 of the tip 35 so as to substantially seal the nozzle opening 31. Notably, this sealing of the nozzle opening 31 facilitates more effective filling of the mortar chamber C1 which, as will be described below, also affects the operation of the piston 24. The sealing action is achieved in part by the elastomeric end member 96 which elastically deforms under compression when the cover member 102 is in the closed position.

Returning now to FIG. 7, the cover assembly 100 also includes a cover member actuator 120 that is operatively connected to the cover member 102 so as to move the cover member 102 between the open position and the closed position. In this embodiment, the cover member actuator 120 is a linear actuator, and particularly a pneumatic actuator. Nevertheless, it is contemplated that the cover member actuator 120 could be any other suitable type of actuator in other embodiments (e.g., a hydraulic actuator, an electric actuator, etc.). The cover member actuator 120 has a fixed portion 122 and a movable portion 124 that is movable relative to the fixed portion 122. The fixed portion 122 includes a distal end 123 of the cover member actuator 120 that is connected to the duct 22, and in particular to the tapering portion 34 of the duct 22. Notably, a fastener 126 connects the distal end 123 to the tapering portion 34 of the duct 22. The movable portion 124 includes a piston rod 128 that is connected to a piston (not shown) disposed within a barrel 130 of the cover member actuator 122, and a rod end 132 defining a proximal end 134 of the cover member actuator 120. When the cover member actuator 120 is actuated, the piston rod 128 extends or retracts from the barrel 130. In order to support the cover member actuator 120 as the movable portion 124 moves, a supporting bracket 133 connected to the nozzle flange 72 defines an opening which receives a part of the barrel 130 of the cover member actuator 120 therein.

The cover member actuator 120 is operatively connected to the cover member 102 by a pivoting link 136. In particular, as shown in FIGS. 7 and 8, the rod end 132 of the cover member actuator 120 is connected to one end 138 of the pivoting link 136 via a fastener 137 extending through a spherical bearing 139 of the rod end 132. A nut 141 receives the fastener 137 on an opposite side of the rod end 132, supported by a washer 143. The opposite end 140 of the pivoting link 136 is connected to one of the arms 106 of the cover member 102 by two fasteners 142 (see FIG. 7). In this embodiment, the pivoting link 136 has an uneven width. Notably, the end 140 of the pivoting link 136 has a greater width than the end 138. In particular, the ends 138, 140 of the pivoting link 136 are rounded and thus have different diameters, with the end 140 having a greater diameter than the end 138. Each of the ends 138, 140 of the pivoting link 136 defines a respective central opening 146 (one of which is shown in FIG. 7). The central opening 146 at the end 138 of the pivoting link 136 receives the fastener 137 therethrough. On the other hand, the central opening 146 at the end 140 of the pivoting link 136 receives in part the pin 115 associated with the arm 106 of the cover member 102 to which the pivoting link 136 is connected.

As shown in FIG. 3, the controller 500 is in communication with the cover member actuator 120. Notably, the controller 500 is operable to selectively actuate the cover member actuator 120 so as to move the cover member 102 between the open and closed positions. In particular, when the mortar applicator 20 is ready to apply mortar, the controller 500 controls the cover member actuator 120 so that the movable portion 124 of the cover member actuator 120 moves to a retracted position, shown in FIG. 9. This causes the pivoting link 146 to pivot about the pins 115 and thus about the pivot axis 111 in an opening direction which causes the cover member 102 to simultaneously pivot about the pivot axis 111 in the opening direction to its open position shown in FIG. 9. As illustrated in FIG. 9, after discharging mortar through the nozzle opening 31, a certain amount of mortar residue RS can remain protruding from the tip 35 of the nozzle opening 30. After the mortar applicator 20 has discharged the desired amount of mortar, the controller 500 controls the cover member actuator 120 so that the movable portion 124 thereof moves to an extended position, shown in FIG. 10. This causes the pivoting link 146 to pivot about the pivot axis 111 in a closing direction (opposite the opening direction) which causes the cover member 102 to simultaneously pivot about the pivot axis 111 in the closing direction to its closed position shown in FIG. 10.

When the cover member 102 moves from the open position to the closed position, an edge of the middle portion 108 of the cover member 102 shears the mortar residue RS at the tip 35 of the nozzle assembly 30. The polymeric tip member 98 facilitates the sliding motion of the cover member 102 over the tip 35 due to the low friction coefficient of its material. Moreover, the high abrasion resistance of the material of the polymeric tip member 98 minimizes wear of the polymeric tip member 98. As can be seen in FIG. 10, when the mortar residue RS is sheared off at the tip 35, no mortar protrudes from the tip 35 so that the mortar applicator 20 is ready to apply mortar again. As mentioned above, this can be helpful to prevent the mortar residue RS from spoiling a subsequent application of mortar as it could result in an uneven layer of mortar being applied by the mortar applicator 20. It is contemplated that the robotic arm 40 could move the mortar applicator 20 out of the way of the bricks 12 when the cover member 102 is moved to the closed position so that the mortar residue RS does not fall on the bricks 12 or on the layer of mortar discharged on the bricks 12 by the mortar applicator 20.

As will be understood, by ensuring that there is no gap between the cover member 102 and the tip 35 of the nozzle assembly 30 in the closed position of the cover member 102 (i.e., such that the inner surface 110 of the cover member 102 is in contact with the outer surface 97 of the tip 35), the mortar residue RS is sheared off at a point closest to the tip 35, thereby resulting in that no mortar protrudes from the tip 35. This close interaction between the cover member 102 and the tip 35 of the nozzle assembly 30 is facilitated by the elastomeric end member 96 and the polymeric tip member 98. Notably, since the tip member 98 is made of polymeric material, the interaction between the metallic cover member 102 and the polymeric tip member 98 does not cause an undue damage on the components. Moreover, the provision of the elastomeric end member 96 allows the tip member 98 to move inwardly to some degree as the elastomeric end member 96 is compressed by the force exerted by the cover member 102 on the tip member 98.

Figure 12:
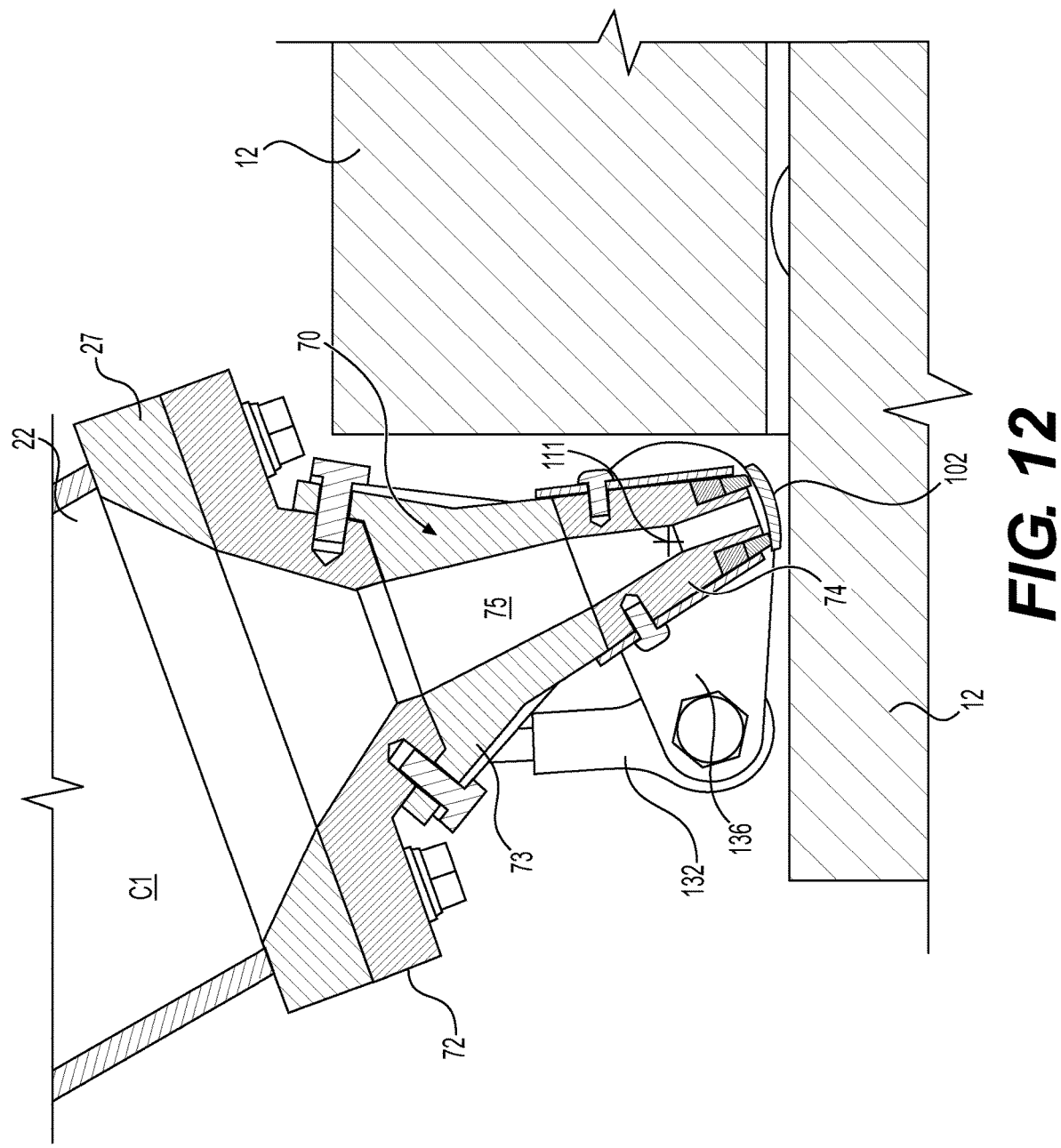
FIG. 12 is a cross-sectional view of the proximal end of the mortar applicator of FIG. 4, showing the mortar applicator in a mortar laying position after applying mortar on a surface, with the cover member in the closed position.

Furthermore, with reference to FIG. 12, the cover member 102 as well as the pivoting link 136 and the cover member actuator 120 are positioned and sized so as to avoid interfering with the operation of the mortar applicator 20 during use. Notably, the cover member 102 and the pivoting link 136 remain compact, close to the nozzle 70 both in the closed and open positions of the cover member 102. This is in part due to the small profile of the cover member 102 (and in particular of its middle cover portion 108) and because the pivot axis 111 extends through the nozzle 70 such that the arcuate path of the cover member 102 between the open and closed positions is close to the nozzle 70. Similarly, the cover member actuator 120 remains out of the way when the movable portion 124 thereof is in its extended or retracted positions.

Returning now to FIGS. 4 to 6, the operation of the mortar applicator 20 to discharge mortar from and subsequently refill mortar into the duct 22 will now be described in detail. Notably, the mortar applicator 20 is operable in two different modes: a discharge mode whereby the mortar applicator 20 discharges mortar through the nozzle opening 31, and a refill mode whereby the mortar applicator 20 is filled with mortar. As will be explained below, the piston 24 is driven differently to move between its fully retracted and fully extended positions based on whether the mortar applicator 20 is operated in the discharge mode or the refill mode.

In the discharge mode, the motor 45 drives the piston 24 toward the fully extended position via the rack and pinion assembly 50. More specifically, the controller 500 controls the motor 45 to drive the rack and pinion assembly 50 and thereby move the piston 24 toward the proximal end 25 of the duct 22 so as to force mortar contained in the mortar chamber C1 through the nozzle opening 31. Moreover, in the discharge mode, the pump 60 is deactivated by the controller 500 so that mortar is not pumped into the mortar chamber C1 while the piston 24 moves toward the fully extended position.

Conversely, in the refill mode, the piston 24 is driven toward the distal end 26 of the duct 22 (i.e., away from the proximal end 25) by increasing pressure within the mortar chamber C1. More specifically, the controller 500 controls the cover member actuator 120 so as to move the cover member 102 to its closed position whereby the cover member 102 seals the nozzle opening 31 so that mortar cannot be discharged therethrough. The controller 500 then activates the pump 60, causing the pump 60 to fill the mortar chamber C1 with mortar. As pressure builds within the mortar chamber C1, this forces the piston 24 to retract away from the proximal end 25 of the duct 22 and toward its fully retracted position. This manner of filling the mortar chamber C1 can reduce the likelihood of air bubbles forming in the mortar within the mortar chamber C1.

Figure 13:
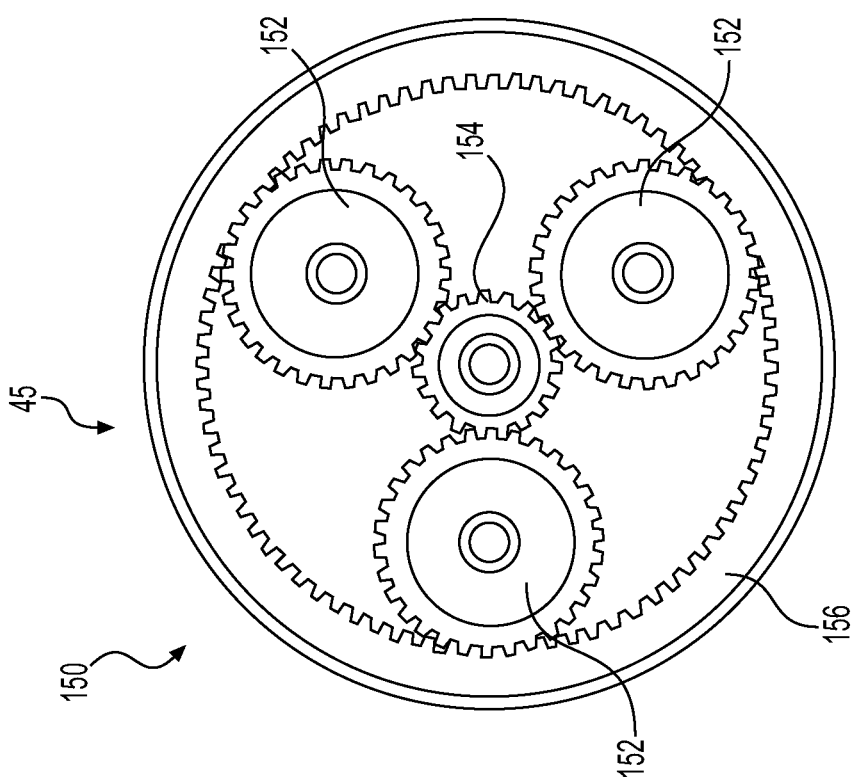
FIG. 13 is a front elevation view of a planetary gear set of a motor of the mortar applicator of FIG. 4.
Figure 14:
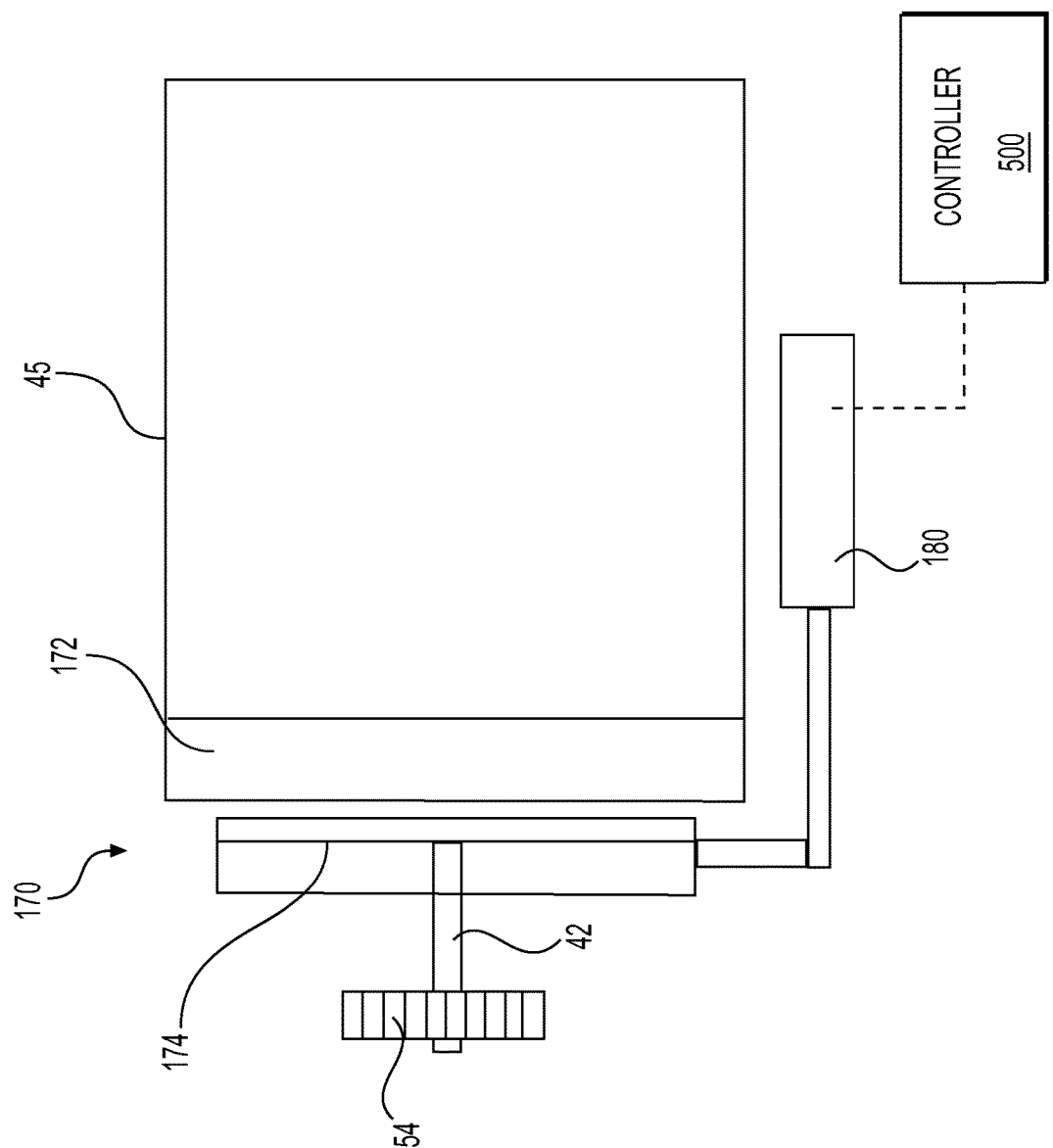
FIG. 14 is a schematic diagram of the motor and a clutch of the mortar applicator according to an alternative embodiment.

In this embodiment, as will be explained in detail below, in order to allow the piston 24 to be driven differently in the discharge mode and the refill mode, the motor 45 is a servomotor that is controlled differently based on the operation mode of the mortar applicator 20. As shown in FIG. 13, the servomotor 45 includes a plurality of gears forming a planetary gear set 150. In particular, the planetary gear set 150 includes a plurality of planetary gears 152, a sun gear 154 operatively connected to the output shaft 42, and an internal gear 156. As will be discussed below, the implementation of the planetary gear set 150 of the servomotor 45 enables the differing operation of the servomotor 45 in the discharge and refill modes.

Furthermore, in this embodiment, as shown in FIG. 3, the controller 500 determines in which of the operation modes the mortar applicator 20 should be operated based at least in part on an input signal from the piston position sensor 502.

In the discharge mode, the servomotor 45 is controlled by the controller 500 to drive the rack and pinion assembly 50 to move the piston 24 toward the proximal end 25 of the duct 22. More specifically, the controller 500 causes the output shaft 42 of the servomotor 45 to rotate in a forward direction that causes the pinion 54 mounted to the output shaft 42 to drive the rack 52 so that the rack 52 moves toward the proximal end 25 of the duct 22. In turn, this causes the piston 24 to move toward the proximal end 25.

Conversely, in the refill mode, the controller 500 controls the servomotor 45 to not rotate the internal gear 156 and permit free motion of the rack and pinion assembly 50 in response to movement of the piston 24 toward the distal end 26 of the duct 22. In other words, in the refill mode, the pinion 54 does not resist linear motion of the rack 52 so that the output shaft 42 can rotate in a reverse direction (opposite the forward direction) as the piston 24 moves toward its fully retracted position. This is achieved in part by the implementation of the planetary gear set 150 of the servomotor 45, as the planetary gear set 150 allows motion to be transmitted in reverse, i.e., from the output shaft 42 to a rotor of the servomotor 45, thus allowing the output shaft 42 to be rotated in the reverse direction in the refill mode. More specifically, movement of the rack 52 rotates the output shaft 42, which in turn rotates the sun gear 154 and the planetary gears 152. The internal gear 156 remains fixed. This motion transmission in reverse would not be easily feasible if the servomotor 45 had a worm drive for example instead of the planetary gear set 150 as it would impede torque transfer in the reverse direction.

In this embodiment, the controller 500 controls the servomotor 45 in the refill mode when the controller 500 receives a signal from the piston position sensor 502 that is indicative that the piston 24 has reached the fully extended position. Notably, when the piston 24 reaches the fully extended position, the mortar chamber C1 has to be refilled in order to continue discharging mortar. The controller 500 thus switches the operation mode of the mortar applicator 20 from the discharge mode to the refill mode when the piston 24 reaches the fully extended position, as indicated by the piston position sensor 502.

The controller 500 also selectively activates and deactivates the pump 60 based on the signal received from the piston position sensor 502. In particular, the controller 500 activates the pump 60 upon receiving the signal from the piston position sensor 502 that is indicative that the piston 24 has reached the fully extended position, so as to begin refilling the mortar chamber C1.

In this embodiment, the controller 500 switches back to controlling the servomotor 45 in the discharge mode when the controller 500 receives a signal from the piston position sensor 502 indicating that the piston 24 is at the fully extended position. It is understood that the piston position sensor 502 may include multiple sensor elements placed along the duct 22 to sense the piston 24 at its different positions. In other embodiments, the controller 500 could switch back to controlling the servomotor 45 in the discharge mode when the controller 500 receives a signal from an operating panel (not shown) triggered by an operator.

As will be understood from the above, in the refill mode, the piston 24 is forced toward its fully extended position by the filling of mortar in the mortar chamber C1, and since the proximal end 56 of the rack 52 is connected to the piston 24, the rack 52 also moves in the same direction as permitted by the operation of the servomotor 45 in the manner described above. However, the proximal end 56 of the rack 52 does not necessarily need to be connected to the piston 42. Notably, as mentioned briefly above, in some embodiments, the piston 24 could instead be floating in the duct 22 and can be driven in generally the same manner. For instance, in such embodiments, in the discharge mode, the proximal end 56 would push the piston 24 toward its fully extended position, while in the refill mode, the piston 24 would push the proximal end 56 of the rack 52 as it travels to the fully retracted position.

The rack and pinion assembly 50 may be driven in the reverse direction in other ways. For instance, with reference to FIG. 14, in alternative embodiments, the motor 45 may not be a servomotor and the mortar applicator 20 includes a clutch 170 for selectively connecting the motor 45 with the rack and pinion assembly 50. A clutch actuator 180 is operatively connected to the clutch 170 for actuation thereof. As can be seen, the controller 500 is in communication with the clutch actuator 180 to control its operation. In this embodiment, the clutch 170 includes a first friction plate 172 connected to a rotor (not shown) of the motor 45 for rotation therewith, and a second friction plate 174 connected to the output shaft 42. The clutch actuator 180 is operatively connected to the second friction plate 174 to move the second friction plate 174 in and out of engagement with the first friction plate 172. In this embodiment, the clutch actuator 180 is a pneumatic actuator. It is contemplated that the clutch actuator 180 could be an electric actuator or any other suitable type of actuator.

Thus, in this embodiment, in the discharge mode, the controller 500 controls the clutch actuator 180 to cause the clutch 170 to couple the motor 45 to the pinion 54 to allow the motor 45 to drive the rack 52. Conversely, in the refill mode, the controller 500 controls the clutch actuator 180 to cause the clutch 170 to decouple the motor 45 from the pinion 54 so that the motor 45 is not in driving engagement with the pinion 54. As such, the motor 45 is decoupled from the pinion 54 when the controller 500 activates the pump 60 to pump mortar into the mortar chamber C1.

The clutch 170 may be configured in any other suitable way in other embodiments.

While the various components of the mortar application system 10 have been described as being controlled by the controller 500, it will be understood that this is done simplify the present description. It is contemplated that the components that are described as controlled by the controller 500 could instead be controlled by separate controllers in communication with one another, or that certain elements are grouped together to be controlled by specific controllers. For instance, a separate controller may be provided to control the motor 45, the pump 60 and the nozzle assembly 30 together.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A mortar applicator comprising:
   a duct having a first end and a second end;
   a piston movably mounted within the duct, the piston dividing the duct into first and second variable volume chambers on opposite sides of the piston, the first variable volume chamber being defined between the piston and the first end of the duct, the second variable volume chamber being defined between the piston and the second end of the duct;
   a pump fluidly connected to the first variable volume chamber to selectively fill the first variable volume chamber with mortar;
   a nozzle operatively connected to the first end of the duct, the nozzle defining a nozzle opening in fluid communication with the first variable volume chamber to discharge the mortar contained therein;
   a piston actuator operatively connected to the piston; and a cover member selectively movable between an open position and a closed position to respectively allow and prevent the mortar to be discharged through the nozzle opening, the mortar applicator being operable in a discharge mode and a refill mode, in the discharge mode, the piston actuator moving the piston toward the first end of the duct to force the mortar contained in the first variable volume chamber through the nozzle opening to discharge the mortar from the mortar applicator; and in the refill mode, the cover member being disposed in the closed position, and the pump filling the first variable volume chamber with the mortar thereby forcing the piston to retract away from the first end of the duct.

2. The mortar applicator of claim 1, wherein:
the piston actuator comprises:
a motor; and
a rack and pinion assembly operatively connecting the motor to the piston, the rack and pinion assembly comprising a rack configured to drive the piston and a pinion connected to the motor;
in the discharge mode, the motor drives the rack and pinion assembly thereby moving the piston toward the first end of the duct to force the mortar contained in the first variable volume chamber through the nozzle opening to discharge the mortar from the mortar applicator; and
the rack moves with the piston in the discharge and refill modes.

3. The mortar applicator of claim 2, further comprising a clutch for selectively connecting the motor with the rack and pinion assembly, wherein:
in the discharge mode, the clutch couples the motor to the pinion to allow the motor to drive the rack; and
in the refill mode, the clutch decouples the motor from the pinion.

4. The mortar applicator of claim 3, further comprising a controller in communication with:
the pump to selectively activate and deactivate the pump to fill the first variable volume chamber with the mortar; and
a clutch actuator operatively connected to the clutch to couple the motor to the pinion and to decouple the motor from the pinion,
the controller controlling the clutch actuator to decouple the motor from the pinion when the controller activates the pump.

5. The mortar applicator of claim 4, wherein the controller is in communication with the motor to control operation of the motor.

6. The mortar applicator of claim 2, further comprising a controller in communication with the motor, wherein:
the motor is a servomotor;
in the discharge mode, the controller controls the servomotor to drive the rack and pinion assembly to move the piston toward the first end of the duct; and
in the refill mode, the controller controls the servomotor to permit free motion of the rack and pinion assembly in response to movement of the piston toward the second end of the duct.

7. The mortar applicator of claim 6, further comprising a piston position sensor configured to sense a position of the piston within the duct, wherein:
the piston is movable within the duct from a fully retracted position to a fully extended position, a range of motion of the piston being defined between the fully retracted and fully extended positions;
a volume of the first variable volume chamber decreases from the fully retracted position to the fully extended position of the piston;
the controller is in communication with the piston position sensor; and
the controller controls the servomotor to operate the mortar applicator in the refill mode when the controller receives a signal from the piston position sensor indicating that the piston has reached the fully extended position.

8. The mortar applicator of claim 6, wherein the servomotor comprises a plurality of gears, the plurality of gears forming a planetary gear.

9. The mortar applicator of claim 2, wherein the rack is connected to the piston.

10. The mortar applicator of claim 2, wherein:
the piston floats within the duct;
the rack pushes the piston when the mortar applicator is operated in the discharge mode; and
the piston pushes the rack when the mortar applicator is operated in the refill mode.

11. The mortar applicator of claim 1, further comprising:
a piston position sensor configured to sense a position of the piston within the duct; and
a controller in communication with the piston position sensor and the pump,
the controller selectively activating and deactivating the pump based on a signal received from the piston position sensor.

12. A mortar application system comprising:
the mortar applicator of claim 1; and
a robotic arm supporting the mortar applicator such that motion of the robotic arm moves the mortar applicator.

13. The mortar application system of claim 12, further comprising a movable platform that is movable along a predefined path, the robotic arm being mounted to the movable platform.

14. A method for assembling a brick wall using a mortar application system,
the system comprising:
at least one robotic arm;
a mortar applicator movable by the at least one robotic arm, the mortar applicator comprising:
a duct having a first end and a second end;
a piston movably mounted within the duct, the piston dividing the duct into first and second variable volume chambers on opposite sides of the piston, the first variable volume chamber being defined between the piston and the first end of the duct, the second variable volume chamber being defined between the piston and the second end of the duct;
a pump fluidly connected to the first variable volume chamber to selectively fill the first variable volume chamber with mortar;
a nozzle operatively connected to the first end of the duct, the nozzle defining a nozzle opening in fluid communication with the first variable volume chamber to discharge the mortar contained therein;
a piston actuator operatively connected to the piston; and
a cover member selectively movable between an open position and a closed position to respectively allow and prevent the mortar to be discharged through the nozzle opening;
the method comprising:

moving the mortar applicator to a mortar laying position using the at least one robotic arm;

applying the mortar to at least one of an existing portion of the wall and a brick to be placed on the wall by moving the piston toward the first end of the duct with the piston actuator;

placing the brick in position on the existing portion of the wall using the at least one robotic arm;

pumping the mortar into the first variable volume chamber, said pumping of the mortar causing the piston to move toward the second end of the duct; and moving the cover member to the closed position prior to pumping the mortar into the first variable volume chamber.

15. The method of claim 14, wherein:

the piston actuator comprises:
  a motor; and
  a rack and pinion assembly operatively connecting the motor to the piston, the rack and pinion assembly comprising a rack configured to drive the piston and a pinion connected to the motor; and moving the piston toward the first end of the duct with the piston actuator comprises moving the piston toward the first end of the duct with the rack and pinion assembly being driven by the motor.

16. The method of claim 15, wherein:

the mortar applicator further comprises a clutch for selectively connecting the motor with the rack and pinion assembly;

moving the piston toward the first end of the duct comprises coupling the motor to the pinion to allow the motor to drive the rack; and the method further comprises decoupling the motor from the pinion to allow the piston to move toward the second end of the duct when pumping the mortar into the first variable volume chamber.

17. The method of claim 15, wherein:

the motor is a servomotor;

moving the piston toward the first end of the duct comprises driving the rack and pinion assembly via the servomotor to move the piston toward the first end of the duct; and the method further comprises:
  controlling the servomotor to permit free motion of the rack and pinion assembly in response to movement of the piston toward the second of the duct.

* * * * *